United States Patent
Verma et al.

(10) Patent No.: US 12,243,196 B2
(45) Date of Patent: Mar. 4, 2025

(54) METHOD AND ELECTRONIC DEVICE FOR PRODUCING MEDIA FILE WITH BLUR EFFECT

(71) Applicant: Samsung Electronics Co., Ltd., Suwon-si (KR)

(72) Inventors: Kartik Verma, Chamba (IN); Yash Awasthi, Kanpur (IN); Ashish Chopra, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 17/860,770

(22) Filed: Jul. 8, 2022

(65) Prior Publication Data

US 2023/0014805 A1 Jan. 19, 2023

Related U.S. Application Data

(63) Continuation of application No. PCT/KR2022/009850, filed on Jul. 7, 2022.

(30) Foreign Application Priority Data

Jul. 7, 2021 (IN) .............................. 202141030556

(51) Int. Cl.
*G06T 5/70* (2024.01)
*G06T 7/194* (2017.01)
(Continued)

(52) U.S. Cl.
CPC ................ *G06T 5/70* (2024.01); *G06T 7/194* (2017.01); *G06T 7/248* (2017.01); *G06V 10/25* (2022.01); *G06T 2207/10024* (2013.01)

(58) Field of Classification Search
CPC ....... G06T 2200/24; G06T 2207/10024; G06T 2207/20104; G06T 5/20; G06T 5/70;
(Continued)

(56) References Cited

U.S. PATENT DOCUMENTS 5,717,463 A 2/1998 Brailean et al.
5,959,696 A 9/1999 Hwang
(Continued)

FOREIGN PATENT DOCUMENTS

CN 111476715 A 7/2020
EP 1 863 283 B1 1/2011
(Continued)

OTHER PUBLICATIONS

International Search Report dated Oct. 14, 2022, issued in PCT Patent Application No. PCT/KR2022/009850.
(Continued)

*Primary Examiner* — Ian L Lemieux
(74) *Attorney, Agent, or Firm* — Jefferson IP Law, LLP

(57) ABSTRACT

A method for producing a media file with a blur effect in an electronic device is provided. The method includes segmenting an image frame into a plurality of segments. Further, the method includes determining at least one segment from the plurality of segments comprising one of a foreground Region of Interest (ROI) and a background region of the ROI and detecting whether one of the foreground region of the ROI and the background region of the ROI comprises motion information and static information. Further, the method includes automatically applying a motion type blur effect and/or a static type blur effect on one of the foreground region of the ROI, and the background region of the ROI. The method includes generating the media file based on the applied the motion type blur effect and the static type blur effect and storing the media file.

20 Claims, 20 Drawing Sheets

(51) Int. Cl.
*G06T 7/246* (2017.01)
*G06V 10/25* (2022.01)

(58) Field of Classification Search
CPC ......... G06T 7/194; G06T 7/248; G06V 10/25; G06V 10/26
See application file for complete search history.

(56) References Cited

U.S. PATENT DOCUMENTS

| | | | |
|---|---|---|---|
| 6,661,918 B1 * | 12/2003 | Gordon | G06T 7/174 382/164 |
| 9,330,446 B2 | 5/2016 | Park | |
| 9,432,575 B2 | 8/2016 | Kuchiki | |
| 9,584,814 B2 | 2/2017 | Socek et al. | |
| 10,482,583 B1 | 11/2019 | Suszek | |
| 10,997,697 B1 | 5/2021 | Newman | |
| 2007/0116356 A1 * | 5/2007 | Gong | G06T 7/194 382/173 |
| 2008/0263012 A1 * | 10/2008 | Jones | G06V 20/40 |
| 2012/0218427 A1 * | 8/2012 | Wu | H04N 23/6811 348/208.6 |
| 2013/0016902 A1 * | 1/2013 | Suino | H04N 1/4072 382/164 |
| 2013/0039409 A1 * | 2/2013 | Gupta | G06V 10/25 375/E7.126 |
| 2014/0254863 A1 * | 9/2014 | Marks | G06V 20/52 382/103 |
| 2014/0362086 A1 | 12/2014 | Brockmann et al. | |
| 2015/0139484 A1 * | 5/2015 | Wu | G06T 7/223 382/103 |
| 2015/0147047 A1 * | 5/2015 | Wang | G06T 5/73 386/280 |
| 2015/0195453 A1 | 7/2015 | Saito | |
| 2016/0239965 A1 | 8/2016 | Kuramoto | |
| 2019/0045193 A1 * | 2/2019 | Socek | G06T 5/30 |
| 2019/0114753 A1 * | 4/2019 | Li | G06T 7/194 |
| 2020/0193609 A1 | 6/2020 | Dharur et al. | |
| 2020/0265565 A1 | 8/2020 | Hwang et al. | |
| 2020/0334793 A1 | 10/2020 | Chen et al. | |
| 2020/0402214 A1 | 12/2020 | Mukherjee et al. | |
| 2021/0150676 A1 | 5/2021 | Sytnik et al. | |
| 2022/0076385 A1 * | 3/2022 | K S | G06T 7/11 |
| 2022/0270215 A1 | 8/2022 | Lee | |

FOREIGN PATENT DOCUMENTS

| | | |
|---|---|---|
| KR | 10-1926490 B1 | 12/2018 |
| KR | 10-2021-0029692 A | 3/2021 |
| KR | 10-2301231 B1 | 9/2021 |
| WO | 2017/082474 A1 | 5/2017 |
| WO | 2021/019318 A1 | 2/2021 |

OTHER PUBLICATIONS

Minaee et al.; Image Segmentation Using Deep Learning: A Survey; IEEE Transactions On Pattern Analysis and Machine Intelligence; vol. 44, No. 7; Jul. 2022; IEEE Computer Society; XP11910208; Feb. 16, 2021.
Partial Supplementary European Search Report dated Aug. 6, 2024; European Appln. No. 22838014.3-1207 / 4338123 PCT/KR2022009850.
Extended European Search Report dated Dec. 18, 2024; European Appln. No. 22838014.3-1207 / 4338123 PCT/KR2022009850.

* cited by examiner

FIG. 5B

Table-3: Typical spectrum range for colors in visible range

| Color | Wavelength (nm) |
|---|---|
| Red | 601–700 |
| Orange | 581–600 |
| Yellow | 551–580 |
| Green | 501–550 |
| Cyan | 451–500 |
| Blue | 401–450 |
| Violet | 380–400 |

Table-4: Wavelength Range Calculation for S1

| Color | Typical Spectrum range ($W_{nl}$, $W_{nu}$) | Range$_o$ | Range$_n$ | Change in range (Range$_n$ – Range$_o$) | Range Change Ratio |
|---|---|---|---|---|---|
| Red | 0 | 0 | 0 | 0 | 0 |
| Orange | 0 | 0 | 0 | 0 | 0 |
| Yellow | 551–580 | 9 | 29 | 20 | 2.22 |
| Green | 0 | 0 | 0 | 0 | 0 |
| Cyan | 0 | 0 | 0 | 0 | 0 |
| Blue | 0 | 0 | 0 | 0 | 0 |
| Violet | 0 | 0 | 0 | 0 | 0 |

Table-5: Wavelength Range Calculation for S1

| Color | Typical Spectrum range ($W_{nl}$, $W_{nu}$) | Range$_o$ | Range$_n$ | Change in range (Range$_n$ – Range$_o$) | Range Change Ratio |
|---|---|---|---|---|---|
| Red | 601–700 | 44 | 99 | 55 | 1.25 |
| Orange | 581–600 | 8 | 19 | 11 | 1.375 |
| Yellow | 551–580 | 12 | 29 | 17 | 1.41 |
| Green | 0 | 0 | 0 | 0 | 0 |
| Cyan | 0 | 0 | 0 | 0 | 0 |
| Blue | 0 | 0 | 0 | 0 | 0 |
| Violet | 0 | 0 | 0 | 0 | 0 |

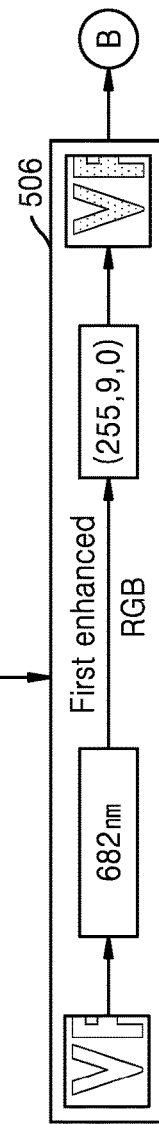

Vf → 682nm → (255,9,0) → Vf
First enhanced RGB (A) (B)

FIG. 6D
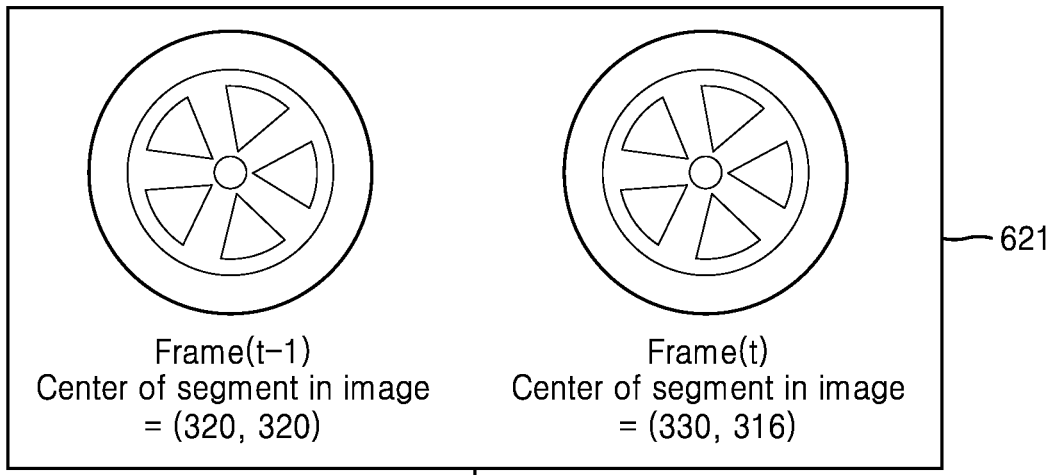
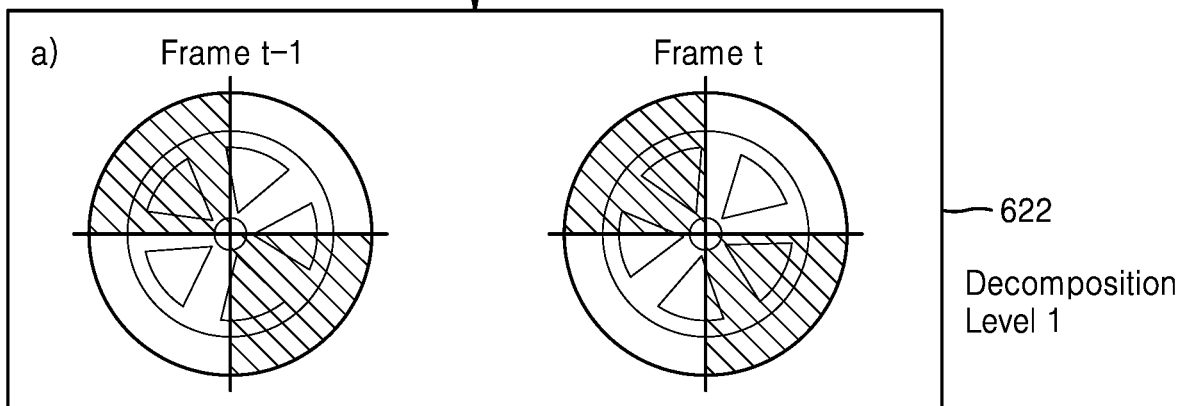
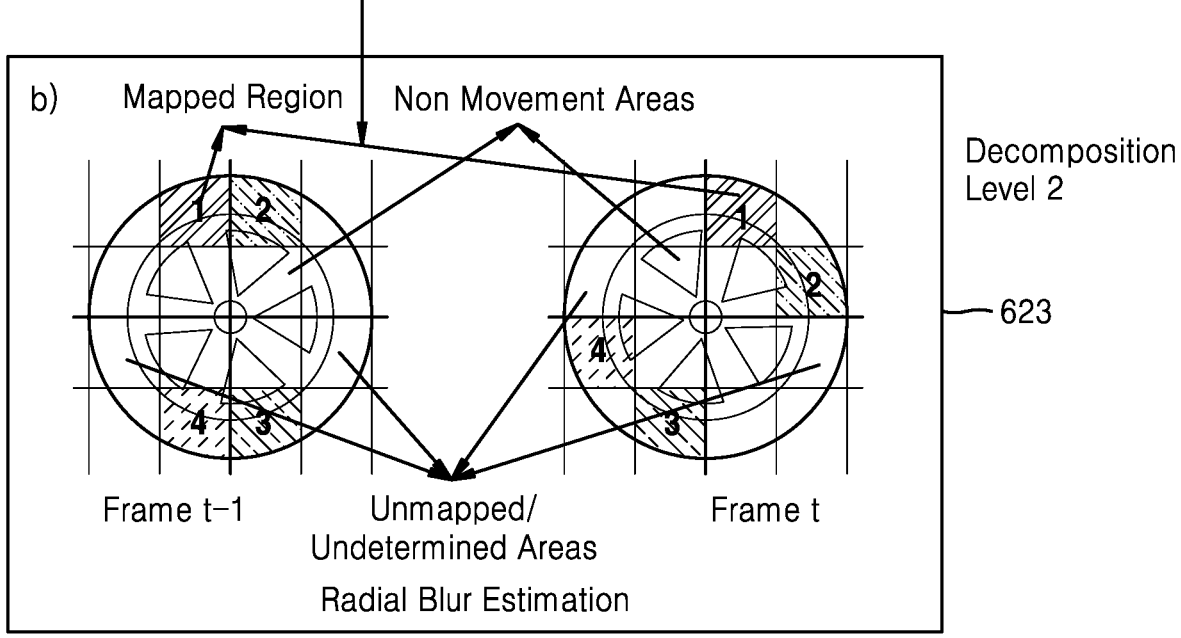

| Blur Type | RGB for nearby pixel(Vs) | RGB for target Pixel(Ve) | Absolute Difference (Ve – Vs) | RMS(D) | Dorg/Di |
|---|---|---|---|---|---|
| Original Image | 15,15,17 | 146,34,34 | 131,19,17 | 133 | 1 |
| Median Blur | 13,14,15 | 32,15,18 | 19,1,3 | 19.26 | 6.9 |
| Bilateral Blur | 15,15,17 | 59,21,19 | 44,6,2 | 44.45 | 2.99 |
| Gaussian Blur | 15,15,17 | 82,25,25 | 67,10,8 | 68.21 | 1.94 |
| Box Blur | 15,15,17 | 106,23,15 | 91,8,2 | 91.37 | 1.455 |
| Channel Blur | 16,17,17 | 111,26,21 | 95,9,4 | 95.51 | 1.39 |

Table 6: Pixel values for all the blurs can be summarized and blur selection

METHOD AND ELECTRONIC DEVICE FOR PRODUCING MEDIA FILE WITH BLUR EFFECT

CROSS-REFERENCE TO RELATED APPLICATION(S)

This application is a continuation application, claiming priority under § 365(c), of an International application No. PCT/KR2022/009850, filed on Jul. 7, 2022, which is based on and claims the benefit of an Indian patent application number 202141030556, filed on Jul. 7, 2021, in the Indian Intellectual Property Office, the disclosure of which is incorporated by reference herein in its entirety.

FIELD OF DISCLOSURE

The disclosure relates to image processing. More particularly, the disclosure relates to a method and electronic device for producing a media file with at least one blur effect.

BACKGROUND

In general, rapid advancement in electronic devices and image photographic technologies have made it easier to capture a variety of images for users by using the image photographic capabilities of electronic devices. There is an increasing demand for the users to be able to capture not only a subject but also an image with a variety of effects (e.g. a bokeh effect, a refocus effect, and a background style effect). Bokeh is a blur effect created by a lens of an electronic device in an out-of-focus region of the image to improve a visual value and to emphasize a primary subject.

FIGS. 1A and 1B illustrate example scenarios in which an existing electronic device utilizes a Gaussian blur/filter for smoothing images and generating a Bokeh effect, according to the related art.

Existing electronic devices utilize various well-known methods to generate the blur effect in an image. A Box blur, a Gaussian blur, a Median blur, and a Min-max blur are examples of well-known methods. In a current scenario's pipeline (1-5), referring to FIG. 1A, where the existing electronic device utilizes the Gaussian blur/filter for smoothing images and generating the Bokeh/blur effect. The blur effect generated by the existing electronic device is ineffective in situations when an image background has contrasting information, the existing electronic device generates the blur effect in the image using a single type of blurring, and the single type of blurring highlights undesired background features in the generated blur effect, alleviating overall user's experience.

Referring to FIG. 1B, contour features in the image background are still apparent. Only one filter can be applied to the image (6) at a time in the existing electronic device (10), and each filter has a set of advantages and disadvantages. For example, the Average/Box filter has no effect on the input image (6) with salt-pepper noise, but the Median filter effectively removes the noise. In another case, after adding the Gaussian blur to the background of the image (7), sharp features may still be seen, such as veins in the leaves, while a foreground of the image (primary subject as "flower") (7) is slightly blurry and not properly emphasized. Furthermore, there is no method to determine a blur type in a video in the existing electronic device (10), where motion blurs are significant when considering video blurring, as it offers a better comprehension of the motion in the video.

Thus, it is desired to at least provide a useful alternative for producing a media file with at least one blur effect.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, a method for producing a media file with a blur effect is provided. The method includes receiving, by an electronic device, an image frame. Further, the method includes segmenting, by the electronic device, the image frame into a plurality of segments, determining, by the electronic device, a segment from the plurality of segments including a foreground region of a ROI and/or a background region of the ROI. Further, the method includes detecting, by the electronic device, whether the foreground region of the ROI and/or the background region of the ROI includes motion information and static information, automatically applying, by the electronic device, a motion type blur effect on the foreground region of the ROI and/or the background region of the ROI includes the motion information and a static type blur effect on the foreground region of the ROI and/or the background region of the ROI includes the static information, generating, by the electronic device, the media file based on the applied the motion type blur effect and the static type blur effect, and storing, by the electronic device, the media file.

In an embodiment of the disclosure, the foreground region of the ROI and/or the background region of the ROI of the image frame is obtained by using a manual selection of a user of the electronic device and/or AI model applied to the image frame.

In an embodiment of the disclosure, the method further includes enhancing a color spectrum region for each segment of the plurality of segments by generating, by the electronic device, the color spectrum region for each segment, and expanding, by the electronic device, a wavelength range of the generated color spectrum region to enhance a value of each pixel of each segment.

In an embodiment of the disclosure, the generating of the color spectrum region for each segment includes obtaining, by the electronic device, a wavelength value for each pixel of each segment, where each pixel includes a Red, Green, Blue (RGB) value, categorizing, by the electronic device, the obtained wavelength value based on the color spectrum region, where the color spectrum region ranging from a red color to violet color, and determining, by the electronic device, the wavelength range and a wavelength range difference for each color for each segment, where the wavelength range includes a lowest value of wavelength and a highest value of wavelength.

In an embodiment of the disclosure, the expanding of the wavelength range of the generated color spectrum region to enhance the value of each pixel of each segment includes determining, by the electronic device, a typical wavelength range and a typical wavelength range difference for each color for each segment, determining, by the electronic device, an absolute difference between the determined wavelength range difference and the typical wavelength range difference for each color for each segment, determining, by the electronic device, a range change ratio for each color for each segment by dividing the absolute difference by the determined wavelength range, determining, by the electronic device, a first-new RGB value for each pixel of each segment based on the typical wavelength range difference, the determined wavelength range difference, the obtained wavelength value, and the lowest value of wavelength, where the first-new RGB value is enhanced value of the RGB value, averaging, by the electronic device, the range change ratio, and determining, by the electronic device, a second-new RGB value for each pixel of each segment based on the average change ratio, where the second-new RGB value is the enhanced value of the first-new RGB value.

In an embodiment of the disclosure, the detecting of whether one the foreground region of the ROI and the background region of the ROI includes the motion information and the static information includes comparing, by the electronic device, two consecutive image frames for obtaining the motion information and/or the static information, where the motion information includes a linear motion and/or a rotational motion.

In an embodiment of the disclosure, the linear motion is calculated based on a linear change in a position of each segment of the plurality of segments.

In an embodiment of the disclosure, the rotational motion is calculated by dividing, by the electronic device, each segment of the plurality of segments of two consecutive image frames into four quads, calculating, by the electronic device, a hash value based on the RGB values for each quad, determining, by the electronic device, whether the hash value of at least two quads match in the corresponding frames, detecting the rotational motion in response to determining that the at least two quads match in the corresponding frames, and dividing each segment of two consecutive image frames into four quads in response to determining that the at least two quads do not match in the corresponding frames.

In an embodiment of the disclosure, automatically applying the motion type blur effect on the foreground region of the ROI and/or the background region of the ROI includes the motion information, and the static type blur effect on the foreground region of the ROI and/or the background region of the ROI includes the static information includes applying the motion type blur effect on the foreground region of the ROI and/or the background region of the ROI when the foreground region of the ROI and/or the background region of the ROI contains the motion information, and applying a plurality of blur effects on the foreground region of the ROI and/or the background region of the ROI when the foreground region of the ROI and/or the background region of the ROI contains the static information.

In an embodiment of the disclosure, applying the plurality of blur effect on the foreground region of the ROI and/or the background region of the ROI when the foreground region of the ROI and/or the background region of the ROI contains the static information includes calculating, by the electronic device, an absolute difference in the RGB value when moving from one pixel to another pixel in each sub-segment for each blur effect of the plurality of blur effect, and applying, by the electronic device, an optimal blur effect from the plurality of blur effect based on a minimum change in color or a maximum change ratio associated with the calculated absolute difference.

In accordance with another aspect of the disclosure, an electronic device for producing the media file with the blur effect is provided. The electronic device includes a media effect controller coupled with a processor and a memory. The media effect controller is configured to receive the image frame, segment the image frame into the plurality of segments, determine the segment from the plurality of segments including the foreground region of the ROI and/or the background region of the ROI, detect whether the foreground region of the ROI and/or the background region of the ROI includes the motion information and the static information, automatically apply the motion type blur effect on the foreground region of the ROI and/or the background region of the ROI includes the motion information and the static type blur effect on the foreground region of the ROI and/or the background region of the ROI includes the static information, generate the media file based on the applied the motion type blur effect and the static type blur effect, and store the media file.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIGS. 5A, 5B, and 5C illustrate a flow diagram illustrating an example scenario where the electronic device enhances a color spectrum region for each segment of the plurality of segments, according to an embodiment of the disclosure;

FIGS. 6A, 6B, 6C, and 6D illustrate calculation and example scenarios where the electronic device identifies whether the foreground region of the ROI and/or the background region of the ROI includes motion information and/or static information present in an image frame, according to an embodiment of the disclosure;

The same reference numerals are used to represent the same elements throughout the drawings.

DETAILED DESCRIPTION

Figure 1A:
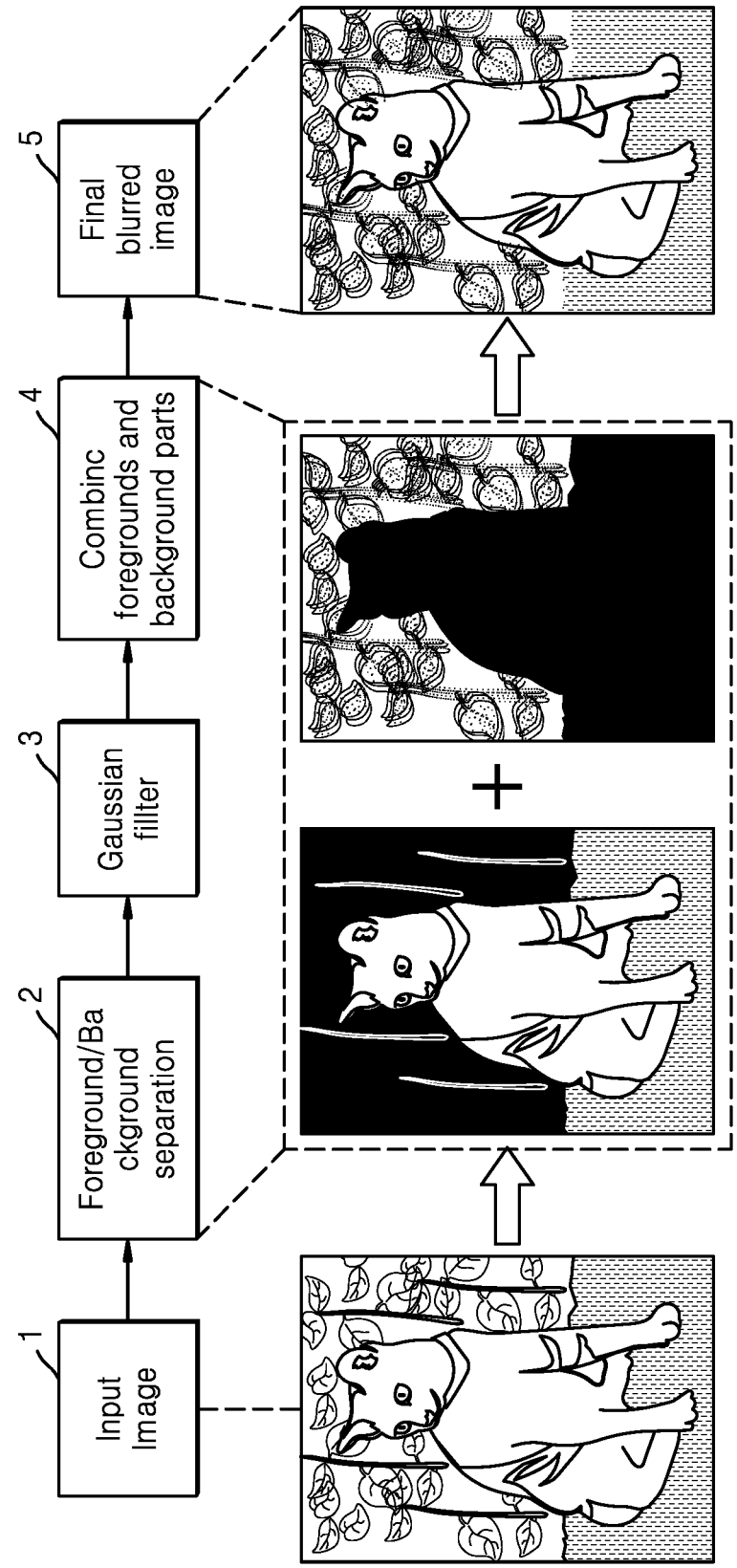
FIGS. 1A and 1B illustrate example scenarios in which an electronic device utilizes a Gaussian blur/filter for smoothing images and generating a Bokeh effect, according to the related art.
Figure 1B:
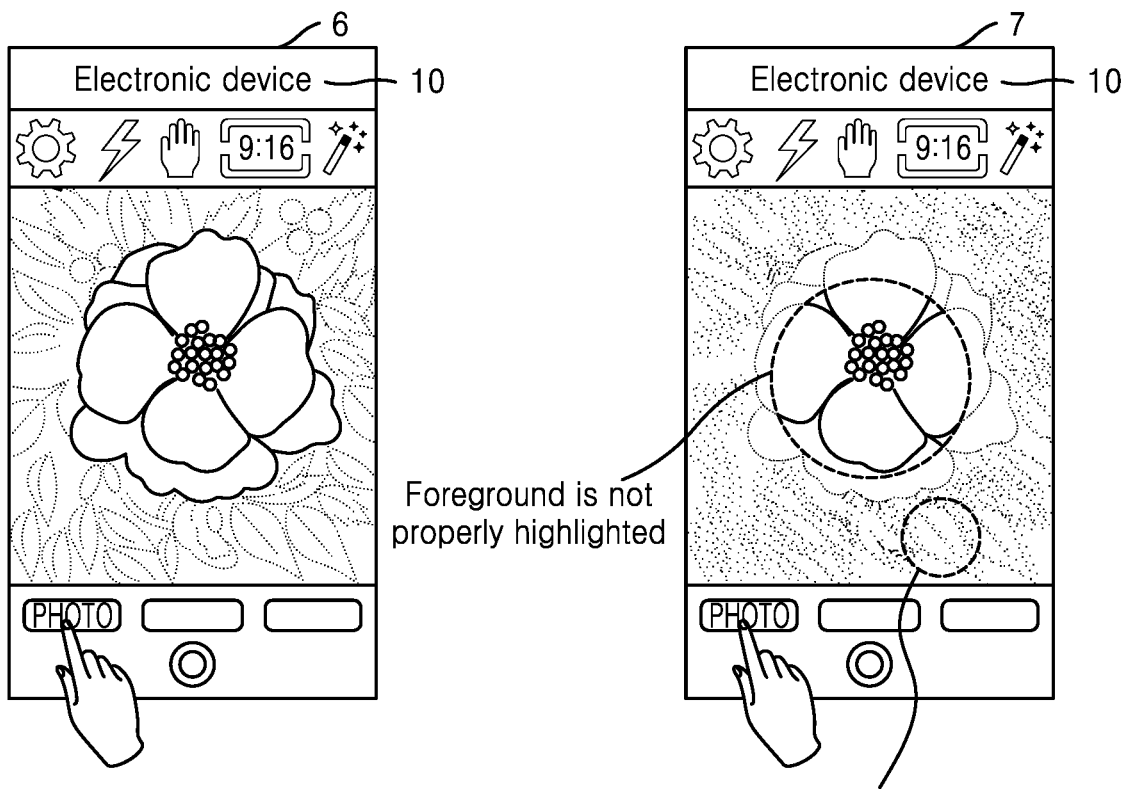

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments described herein are not necessarily mutually exclusive, as some embodiments of the disclosure can be combined with one or more embodiments of the disclosure to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like may be used herein to describe various elements, these elements should not be limited by these terms. These terms are generally only used to distinguish one element from another.

Accordingly, embodiments herein disclose a method for producing a media file with a blur effect. The method includes receiving, by an electronic device, an image frame when the electronic device captures at least one image. Further, the method includes segmenting, by the electronic device, the image frame into a plurality of segments. Further, the method includes determining, by the electronic device, a segment from the plurality of segments including a foreground region of a ROI and/or a background region of the ROI. Further, the method includes detecting, by the electronic device, whether the foreground region of the ROI and/or the background region of the ROI includes motion information and static information. Further, the method includes automatically applying, by the electronic device, a motion type blur effect on the foreground region of the ROI and/or the background region of the ROI includes the motion information and a static type blur effect on the foreground region of the ROI and/or the background region of the ROI includes the static information. Further, the method includes generating, by the electronic device, the media file based on the applied the motion type blur effect and the static type blur effect. Further, the method includes storing, by the electronic device, the media file.

Embodiments herein disclose the electronic device for producing the media file with the blur effect. The electronic device includes a media effect controller coupled with a processor and a memory. The media effect controller is configured to receive the image frame. Further, the media effect controller is configured to segment the image frame into the plurality of segments. Further, the media effect controller is configured to determine the segment from the plurality of segments including the foreground region of the ROI and/or the background region of the ROI. Further, the media effect controller is configured to detect whether the foreground region of the ROI and/or the background region of the ROI includes the motion information and the static information. Further, the media effect controller is configured to automatically apply the motion type blur effect on the foreground region of the ROI and/or the background region of the ROI includes the motion information and the static type blur effect on the foreground region of the ROI and/or the background region of the ROI includes the static information. Further, the media effect controller is configured to generate the media file based on the applied the motion type blur effect and the static type blur effect. Further, the media effect controller is configured to store the media file.

The electronic device, systems, and the proposed method allows the electronic device to generate the media file by automatically applying the motion type blur effect on the foreground region of the ROI and/or the background region of the ROI that contains the motion information and the static type blur effect on the foreground region of the ROI and/or the background region of the ROI that contains the static information. As a result, a multi-type blurring effect is created in real-time in the media file, enhancing the user's experience.

The electronic devices, systems, and the proposed method allows the electronic device to optimize a color spectrum region for each segment of the plurality of segments by expanding a wavelength range of generated color spectrum region for each segment to enhance a value of each pixel of each segment. The plurality of segments includes the foreground region of the ROI and/or the background region of the ROI. The foreground region of the ROI and the background region of the ROI of the image frame is obtained by using a one-of-a manual selection of a user of the electronic device and/or by applying the AI model on the image frame.

Referring now to the drawings, and more particularly to FIGS. 2 to 4, 5A to 5C, 6A to 6D, 7A, 7B, 7C, 7D, 8A, 8B, 9A, and 9B, where similar reference numbers denote corresponding features consistently throughout the figures, there are shown embodiments of the disclosure.

Figure 2:
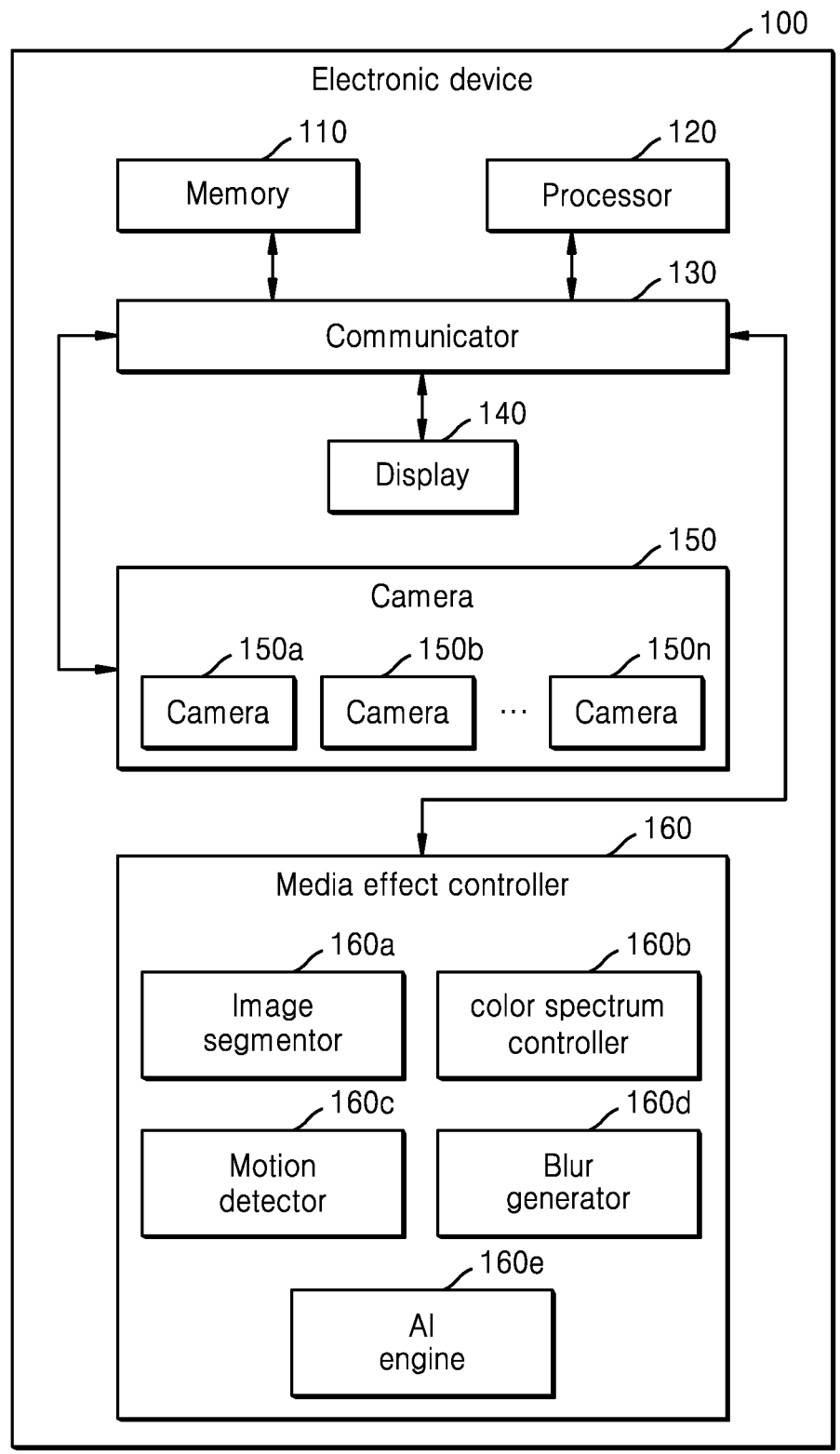
FIG. 2 illustrates a block diagram of an electronic device for producing a media file with the Bokeh effect, according to an embodiment of the disclosure.

FIG. 2 illustrates a block diagram of an electronic device for producing a media file with the Bokeh effect, according to an embodiment of the disclosure.

Referring to FIG. 2, the electronic device 100 can be, for example, but not limited to a smartphone, a laptop, an internet of things (IoT) device, a drone, an action camera, a sports camera, or alike.

In an embodiment, the electronic device 100 may include a memory 110, a processor 120, a communicator 130, a display 140, a camera 150, and a media effect controller 160.

The memory 110 stores the media file, data corresponding to a color spectrum region for each segment of an image frame, data corresponding to a wavelength range of the generated color spectrum region to enhance a value of each pixel of each segment, a wavelength value for each pixel of each segment, data corresponding to a wavelength range difference for each color for each segment, data corresponding to a typical wavelength range and data corresponding to a typical wavelength range difference for each color for each segment, data corresponding to an absolute difference between determined wavelength range difference and the typical wavelength range difference for each color for each segment, a range change ratio for each color for each segment, a first-new RGB value for each pixel, a second-new RGB value for each pixel, motion information and static information of each segment, a hash value, and a minimum change in color or a maximum change ratio associated with calculated absolute difference.

The memory 110 also stores instructions to be executed by the processor 120. The memory 110 may include non-volatile storage elements. Examples of such non-volatile storage elements may include magnetic hard disks, optical discs, floppy disks, flash memories, or forms of erasable programmable read only memories (EPROMs) or electrically erasable and programmable ROMs (EEPROM). In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information. In certain examples, a non-transitory storage medium may store data that can, over time, change (e.g., in Random Access Memory (RAM) or cache). The memory 110 can be an internal storage unit or it can be an external storage unit of the electronic device 100, a cloud storage, or any other type of external storage.

The processor 120 communicates with the memory 110, the communicator 130, the display 140, the camera 150, and the media effect controller 160. The processor 120 is configured to execute instructions stored in the memory 110 and to perform various processes. The processor may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an AI dedicated processor such as a neural processing unit (NPU).

The communicator 130 includes an electronic circuit specific to a standard that enables wired or wireless communication. The communicator 130 is configured for communicating internally between internal hardware components and with external devices via one or more networks. The display 140 is configured to display the generated media file on a screen of the electronic device 100. The camera 150 includes a primary camera 150a and a secondary camera 150b-150n to capture an image of an image frame.

The media effect controller 160 may be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may be embodied in one or more semiconductors. In an embodiment, the media effect controller 160 may be combined to the processor 120 and the processor 120 may perform all the functions conducted by the media effect controller 160.

The media effect controller 160 may be configured to receive the image frame. The image in the image frame may be captured by the camera 150. The media effect controller 160 may be configured to segment the image frame into a plurality of segments. The media effect controller 160 may be configured to determine a segment from the plurality of segments including a foreground region of a ROI and/or a background region of the ROI. The media effect controller 160 may be configured to detect whether the foreground region of the ROI and/or the background region of the ROI includes the motion information and the static information. The media effect controller 160 may be configured to automatically apply a motion type blur effect to the foreground region of the ROI and/or the background region of the ROI including the motion information. The media effect controller 160 may be configured to automatically apply a static type blur effect to the foreground region of the ROI and/or the background region of the ROI including the static information. The media effect controller 160 may be configured to generate the media file based on the applied the motion type blur effect and/or the static type blur effect. The media effect controller 160 may be configured to store the media file.

The media effect controller 160 may be configured to determine the foreground region of the ROI and/or the background region of the ROI of the image frame obtained by using a manual selection of a user of the electronic device 100 and/or AI model applied to the image frame.

The media effect controller 160 may be configured to enhance the color spectrum region for each segment of the plurality of segments. The media effect controller 160 may be configured to generate the color spectrum region for each segment. The media effect controller 160 may be configured to expand the wavelength range of the generated color spectrum region to enhance the value of each pixel of each segment.

The media effect controller 160 may be configured to obtain the wavelength value for each pixel of each segment, where each pixel includes an RGB value. The media effect controller 160 may be configured to categorize the obtained wavelength value based on the color spectrum region, where the color spectrum region ranging from a red color to violet color. The media effect controller 160 may be configured to determine the wavelength range and a wavelength range difference for each color for each segment, where the wavelength range may be determined between the lowest value of wavelength and the highest value of wavelength.

The media effect controller 160 may be configured to determine the typical wavelength range and the typical wavelength range difference for each color of each segment. The media effect controller 160 may be configured to determine the absolute difference between the determined wavelength range difference and the typical wavelength range difference for each color of each segment. The media effect controller 160 may be configured to determine the range change ratio for each color of each segment by dividing the absolute difference by the determined wavelength range. The media effect controller 160 may be configured to determine the first-new RGB value for each pixel of each segment based on the typical wavelength range difference, the determined wavelength range difference, the obtained wavelength value, and the lowest value of wavelength, where the first-new RGB value is enhanced value of the RGB value. The media effect controller 160 may be configured to average the range change ratio. The media effect controller 160 may be configured to determine the second-new RGB value for each pixel of each segment based on the average change ratio, where the second-new RGB value is the enhanced value of the first-new RGB value.

The media effect controller 160 may be configured to compare two consecutive image frames for obtaining the motion information and/or the static information, where the motion information includes a linear motion and/or a rotational motion. The linear motion is calculated based on a linear change in a position of each segment of the plurality of segments. The media effect controller 160 is configured to divide each segment of the plurality of segments of two consecutive image frames into four quads. The media effect controller 160 is configured to calculate the hash value based on the RGB values for each quad of each segment. The media effect controller 160 is configured to determine whether the hash value of at least two quads in two consecutive frames matches each other. The media effect controller 160 may be configured to detect the rotational motion in response to determining that the at least two quads match in the corresponding frames. The media effect controller 160 is configured to divide each segment of two consecutive image frames into four quads in response to determining that the at least two quads do not match in the corresponding frames.

The media effect controller 160 may be configured to apply the motion type blur effect on the foreground region of the ROI and/or the background region of the ROI when the foreground region of the ROI and/or the background region of the ROI contains the motion information i.e., motion value exceeding a predetermined threshold value is detected for the foreground region of the ROI and/or the background region of the ROI. The media effect controller 160 may be configured to apply a plurality of blur effect on the foreground region of the ROI and/or the background region of the ROI when the foreground region of the ROI and/or the background region of the ROI contains the static information.

The media effect controller 160 may be configured to calculate an absolute difference in the RGB value when moving from one pixel to another pixel in each sub-segment for each blur effect among the plurality of blur effects. The media effect controller 160 may be configured to apply an optimal blur effect among the plurality of blur effect based on the minimum change in color or the maximum change ratio associated with the calculated absolute difference.

The media effect controller 160 includes an image segmentor 160*a*, a color spectrum controller 160*b*, a motion detector 160*c*, a blur generator 160*d*, and an AI engine 160*e*.

In an embodiment, the image segmentor 160*a* receives the image frame and segments the image frame into the plurality of segments. Further, the image segmentor 160*a* determines the segment which includes either the foreground region of the ROI or the background region of the ROI. The foreground region of the ROI and the background region of the ROI of the image frame is obtained by using the manual selection of the user of the electronic device 100 and/or by applying an AI model (i.e., the AI engine 160*e*) to the image frame.

The color spectrum controller 160*b* enhances the color spectrum region for each segment of the plurality of segments. The color spectrum controller 160*b* generates the color spectrum region for each segment. The color spectrum controller 160*b* expands the wavelength range of the generated color spectrum region to enhance the value of each pixel of each segment. The color spectrum controller 160*b* obtains the wavelength value for each pixel of each segment. The color spectrum controller 160*b* categorizes the obtained wavelength value based on the color spectrum region. Further, the color spectrum controller 160*b* determines the wavelength range and the wavelength range difference for each color of each segment.

The color spectrum controller 160*b* determines the typical wavelength range and the typical wavelength range difference for each color of each segment. The color spectrum controller 160*b* determines the absolute difference between the determined wavelength range difference and the typical wavelength range difference for each color of each segment. The color spectrum controller 160*b* determines the range change ratio for each color for each segment by dividing the absolute difference by the determined wavelength range. The color spectrum controller 160*b* determines the first-new RGB value for each pixel of each segment based on the typical wavelength range difference, the determined wavelength range difference, the obtained wavelength value, and the lowest value of wavelength. The color spectrum controller 160*b* averages the range change ratio. The color spectrum controller 160*b* determines the second-new RGB value for each pixel of each segment based on the average change ratio.

The motion detector 160*c* detects whether the foreground region of the ROI and/or the background region of the ROI includes the motion information and the static information. The motion detector 160*c* compares two consecutive image frames for obtaining the motion information and/or the static information. The motion detector 160*c* calculates the linear motion based on the linear change in the position of each segment of the plurality of segments.

The motion detector 160*c* divides each segment of the plurality of segments of two consecutive image frames into four quads. The motion detector 160*c* calculates the hash value based on the RGB values for each quad. The motion detector 160*c* determines whether the hash value of at least two quads matches the corresponding frames. The motion detector 160*c* detects the rotational motion in response to determining that the at least two quads match in the corresponding frames. The motion detector 160*c* divides each segment of two consecutive image frames into four quads in response to determining that the at least two quads do not match in the corresponding frames.

The blur generator 160d automatically applies the motion type blur effect on the foreground region of the ROI and/or the background region of the ROI includes the motion information and the static type blur effect on the foreground region of the ROI and/or the background region of the ROI includes the static information. The blur generator 160d applies the motion type blur effect on the foreground region of the ROI and/or the background region of the ROI when the foreground region of the ROI and/or the background region of the ROI contains the motion information. Further, the blur generator 160d applies the plurality of blur effect on the foreground region of the ROI and/or the background region of the ROI when the foreground region of the ROI and/or the background region of the ROI contains the static information.

The blur generator 160d calculates the absolute difference in the RGB value when moving from one pixel to another pixel in each sub-segment for each blur effect of the plurality of blur effect. The blur generator 160d applies the optimal blur effect from the plurality of blur effect based on the minimum change in color or the maximum change ratio associated with the calculated absolute difference. The blur generator 160d generates the media file based on the applied the motion type blur effect and the static type blur effect. The blur generator 160d stores the media file.

At least one of the plurality of modules/components may be implemented through the AI engine 160e. A function associated with the AI engine 160e may be performed through the memory 110 and the processor 120. The one or a plurality of processors controls the processing of the input data in accordance with a predefined operating rule or the AI engine 160e stored in the non-volatile memory and the volatile memory. The predefined operating rule or artificial intelligence model is provided through training or learning.

Being provided through learning means that, by applying a learning process to a plurality of learning data, a predefined operating rule or the AI engine 160e of the desired characteristic is made. The learning may be performed in the electronic device 100 itself in which AI according to an embodiment is performed, and/or maybe implemented through a separate server/system.

The AI engine (160e) may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (e.g., a robot) using a plurality of learning data to cause, allow, or control the target device to make a determination or prediction. Examples of learning processes include, but are not limited to, supervised learning, unsupervised learning, semi-supervised learning, or reinforcement learning.

Although FIG. 2 shows various hardware components of the electronic device 100, it is to be understood that other embodiments are not limited thereon. In other embodiments, the electronic device 100 may include fewer or more components. Further, the labels or names of the components are used only for illustrative purpose and does not limit the scope of the disclosure. One or more components can be combined together to perform same or substantially similar function to produce the media file with the blur effect.

Figure 3:
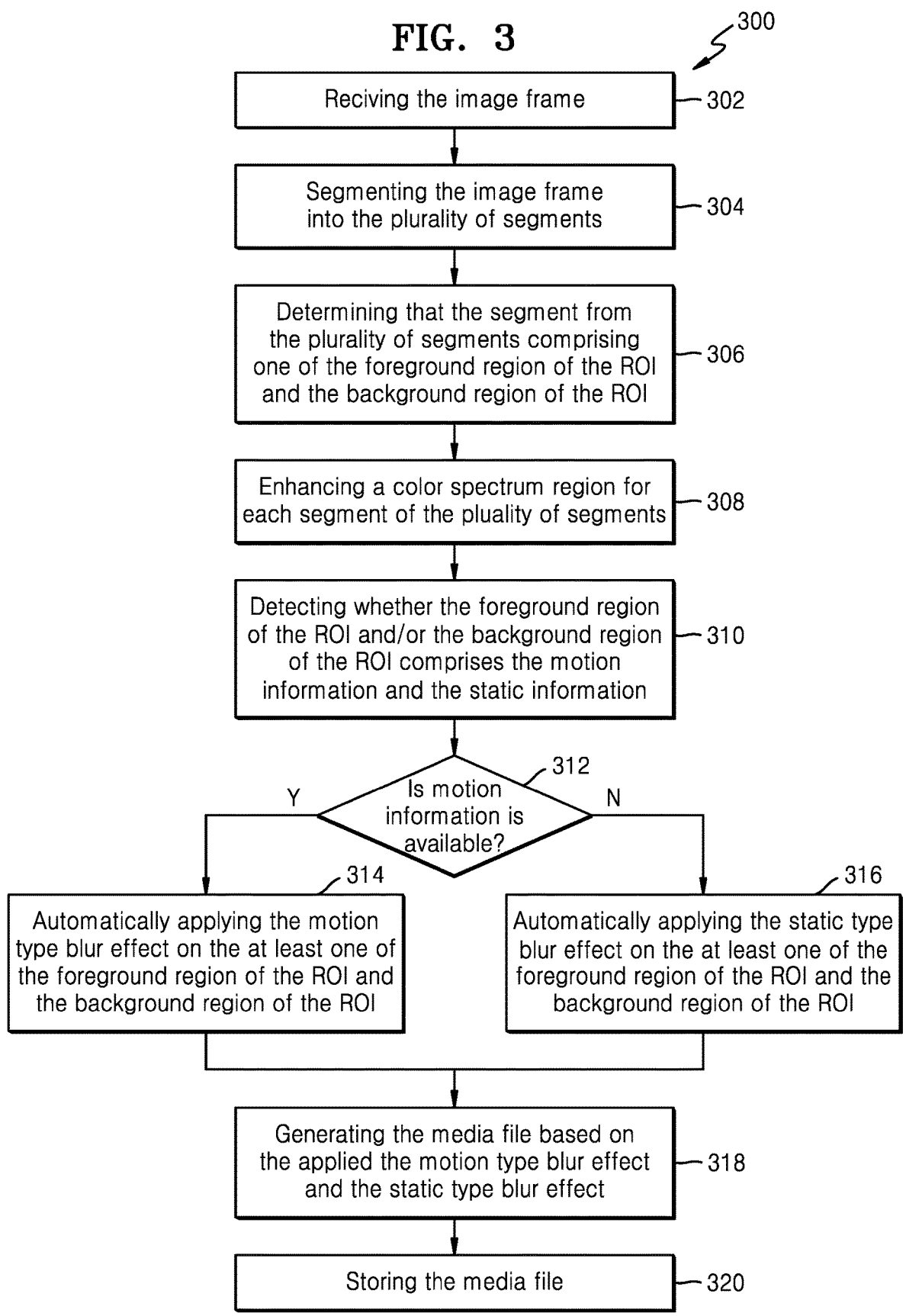
FIG. 3 is a flow diagram illustrating a method for producing the media file with the Bokeh effect, according to an embodiment of the disclosure.

FIG. 3 is a flow diagram 300 illustrating a method for producing the media file with the Bokeh effect, according to an embodiment of the disclosure. The operations 302 to 320 are performed by the electronic device 100.

Referring to FIG. 3, at operation 302, the method includes receiving the image frame. At operation 304, the image frame is segmented into the plurality of segments. At operation 306, the segment is determined from the plurality of segments including the foreground region of the ROI and/or the background region of the ROI. At operation 308, the color spectrum region for each segment of the plurality of segments is enhanced. The operation 308 may be skipped by a designer's choice in processing the input image.

At operations 310 to 312, it is determined whether the foreground region of the ROI and/or the background region of the ROI includes the motion information and the static information. At operation 314, the motion type blur effect is automatically applied on the foreground region of the ROI and/or the background region of the ROI when the foreground region of the ROI and/or the background region of the ROI includes the motion information. At operation 316, the static type blur effect is automatically applied on the foreground region of the ROI and/or the background region of the ROI when the foreground region of the ROI and/or the background region of the ROI includes the static information. At operation 318, the media file is generated based on the applied the motion type blur effect and the static type blur effect. At operation 320, the media file is stored in a memory.

The various actions, acts, blocks, operations, or the like in the flow diagram 300 may be performed in the order presented, in a different order or simultaneously. In some embodiments, some of the actions, acts, blocks, operations, or the like may be omitted, added, modified, skipped, or the like without departing from the scope of the disclosure.

Figure 4:
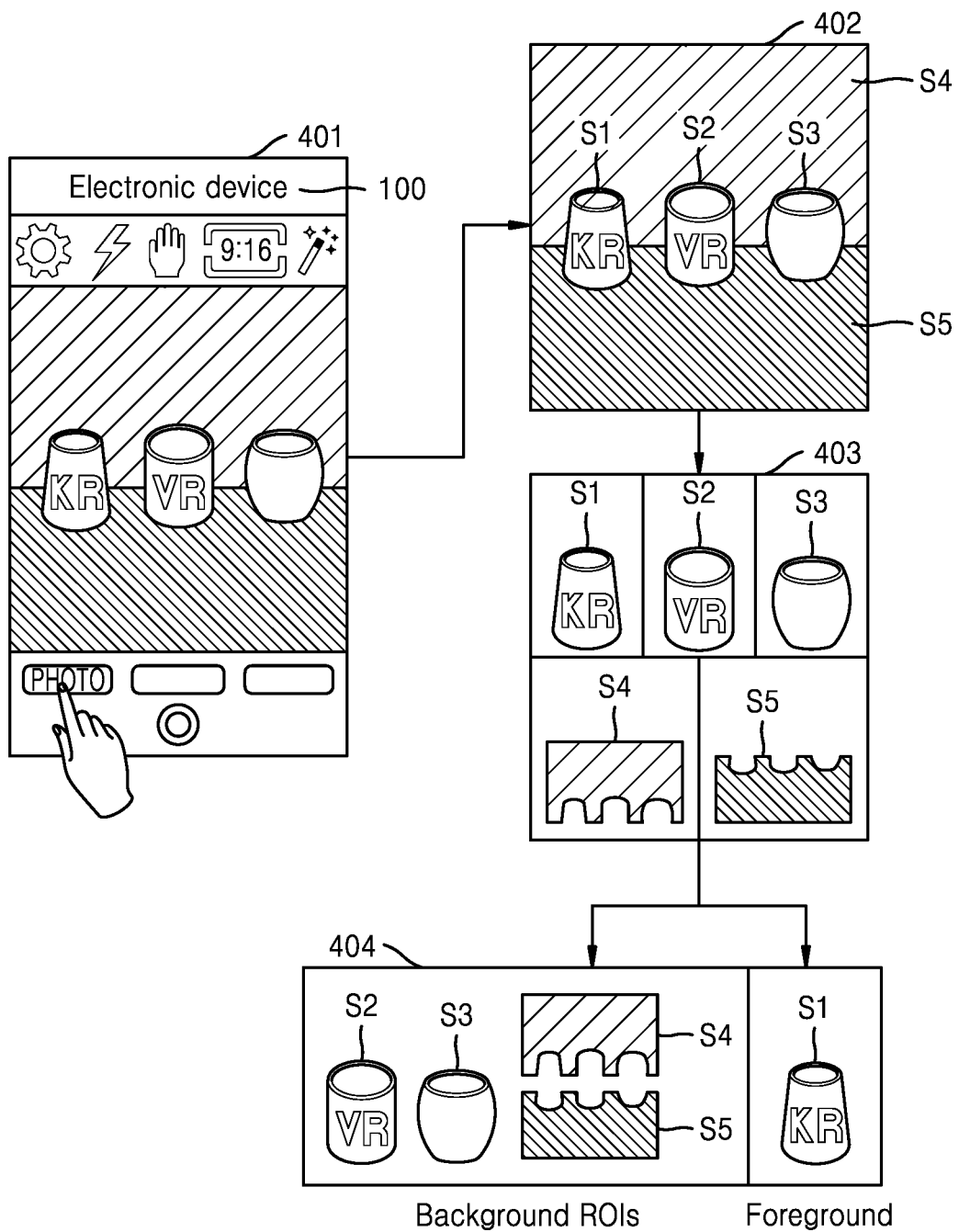
FIG. 4 is a flow diagram illustrating an example scenario where an electronic device determines one segment from a plurality of segments including a foreground region of a ROI and/or a background region of the ROI, according to an embodiment of the disclosure.

FIG. 4 is a flow diagram illustrating an example scenario where an electronic device determines one segment from the plurality of segments including the foreground region of the ROI and/or the background region of the ROI, according to an embodiment of the disclosure.

Referring to FIG. 4, at operation 401, the image segmentor 160a receives the image frame. At operation 402, the image segmentor 160a segments the image frame into the plurality of segments S1-S5. For example, the image segmentor 160a uses a Deep Lab segmentation mechanism to segment the image frame into the plurality of segments S1-S5. At operations 403 and 404, the image segmentor 160a determines the segment from the plurality of segments S1-S5 comprising the foreground region of the ROI (S1) and/or the background region of the ROI (S2-S5). The foreground region of the ROI (S1) and the background region of the ROI (S2-S5) is obtained by using the manual selection of the user of the electronic device 100 (user-selected object is considered the foreground region of the ROI (S1) in a manual mode) and/or the AI engine 160e applied to the image frame (the foreground region of the ROI (S1) is determined by using depth map analysis in an auto mode). That is, the foregoing region of the ROI may be a region with the lowest depth in the depth map of the captured image.

Figure 5A:
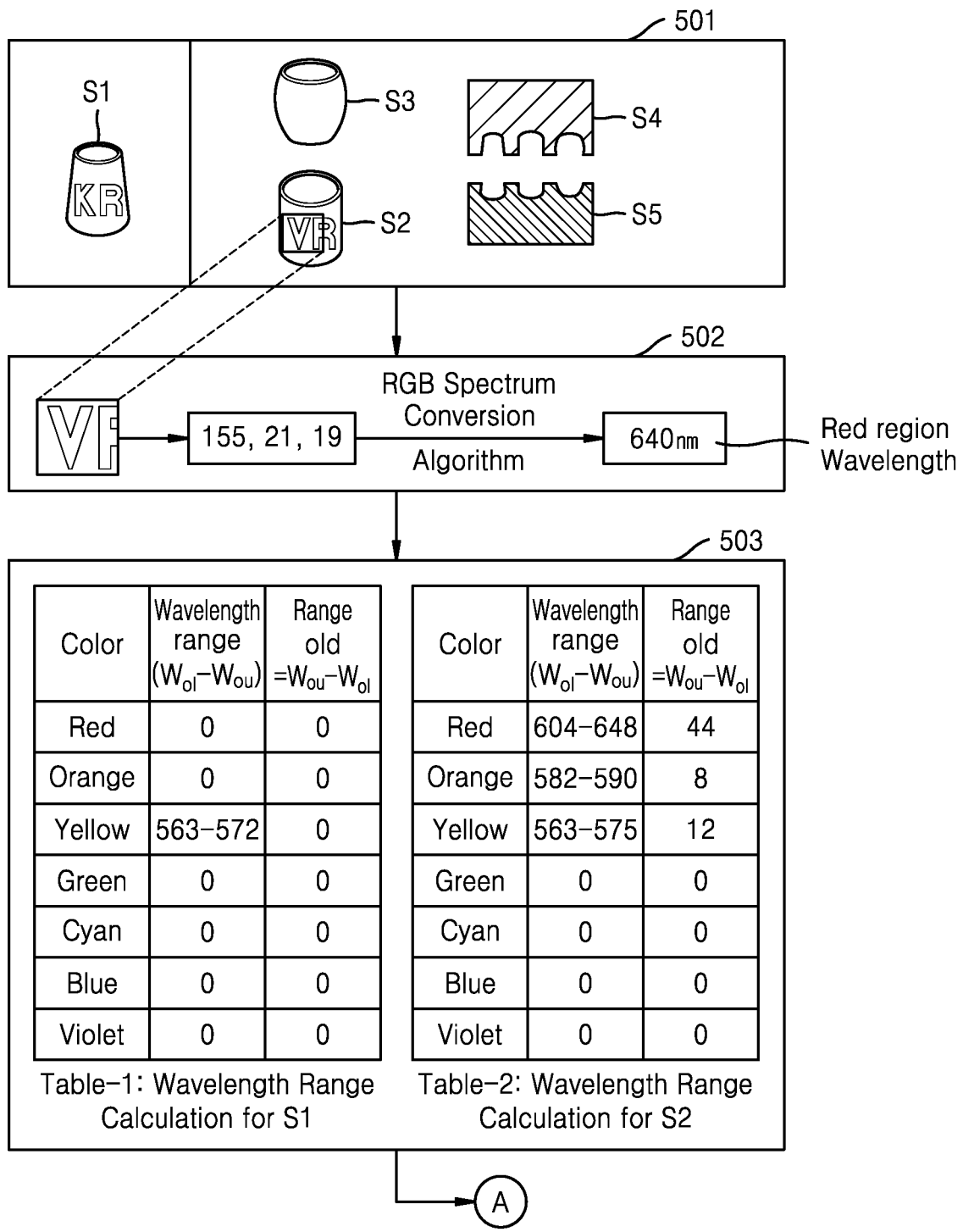
Figure 5C:
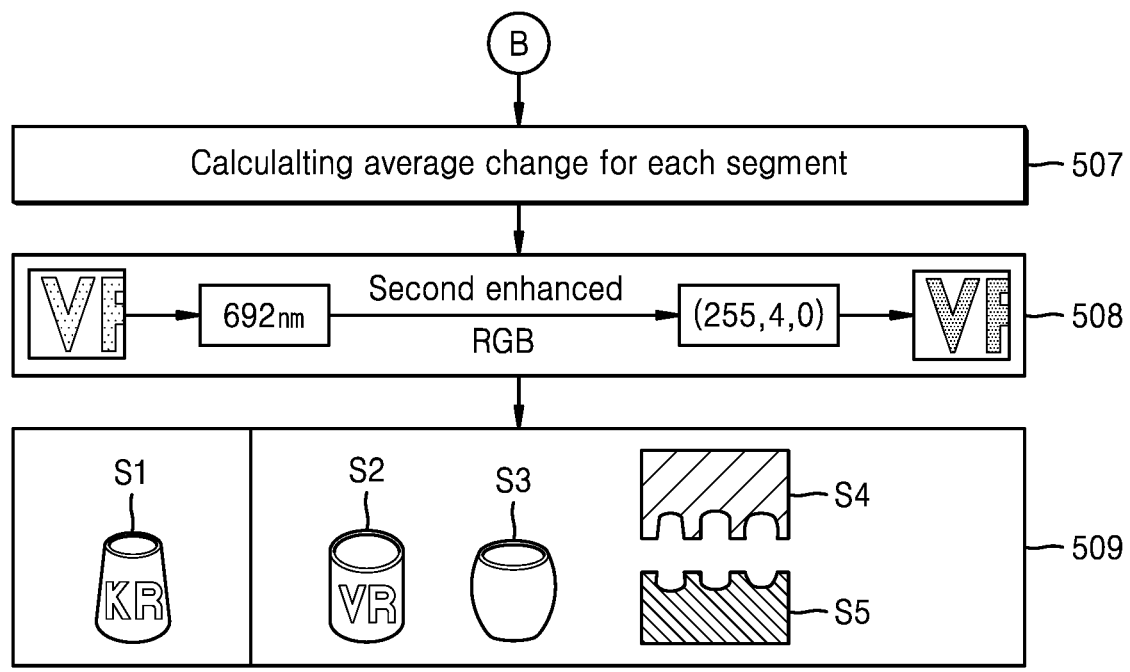

FIGS. 5A, 5B, and 5C illustrate a flow diagram illustrating an example scenario where a color spectrum controller 160b of an electronic device 100 enhances the color spectrum region for each segment of the plurality of segments, according to an embodiment of the disclosure.

Referring to FIGS. 5A, 5B, and 5C, at operation 501, the color spectrum controller 160b receives the foreground region of the ROI (S1) and the background region of the ROI (S2-S5) from the image segmentor 160a. At operation 502, the color spectrum controller 160b obtaining the wavelength value for each pixel of each segment (S1-S5), where each pixel including the RGB value(s). For example, consider a pixel in a yellow area with RGB value(s) of (155, 21, 19), which is transformed to the wavelength value of (Wcurrent=640 nm) using an RGB spectrum conversion method. Calculate for each ROI segment (S1-S5) individually and assign each pixel to a relevant color in the spectrum.

At operation 503, the color spectrum controller 160b categorizes the obtained wavelength value based on the color spectrum region, where the color spectrum region ranging from the red color to the violet color and determines the wavelength range and the wavelength range difference for each color for each segment, where the wavelength range including the lowest value of wavelength and the highest value of wavelength. The wavelength range and the wavelength range difference is calculated for each color for each segment (S1-S5) is given by the below equations, Wavelength range old=($Wol$ to $Wou$)   Equation 1

Wavelength range difference(Range_old)=$Wou-Wol$   Equation 2

In Equations 1 and 2, "W" indicates wavelength, "Wol" is W (old, lowest) indicates the lowest value of W for given color in the color spectrum, "Wou" is W (old, highest) indicates the highest value of W for given color in the color spectrum. For example, wavelength range calculation for the S1, as shown in Table 1 and wavelength range calculation for the S2, as shown in Table 2. If the range change is less than a certain number or is not detected in the particular ROI, the wavelength range obtained for the given color is discarded and set to 0.

At operation 504, the color spectrum controller 160b determines the typical wavelength range and the typical wavelength range difference for each color for each segment (S1-S5). Table 3 shows a typical spectrum range for colors in a visible range. The visible range is expanded to include the entire visible spectrum. The typical wavelength range difference is calculated for each color for each segment (S1-S5) is given by the below equation, Wavelength range difference(Range_new)=$Wnu-Wnl$   Equation 3

In Equation 3, "Wnl" is W (new, lowest) indicates the lowest value of W for given color in the typical color spectrum, "Wnu" is W (new, highest) indicates the highest value of W for given color in the typical color spectrum.

At operation 505, the color spectrum controller 160b determines the absolute difference between the determined wavelength range difference and the typical wavelength range difference for each color for each segment (S1-S5). The absolute difference is calculated for each color for each segment (S1-S5) is given by the below equation, Change in range=|Range_new−Range_old|   Equation 4

The color spectrum controller (160b) determines the range change ratio for each color for each segment by dividing the absolute difference by the determined wavelength range. The range change ratio is calculated for each color for each segment (S1-S5) is given by the below equation, Range change ratio=(Change in range)/Range   Equation 5

For example, wavelength range broadening for the S1, as shown in Table 4, and wavelength range broadening for the S2, as shown in Table 5. Colors that are not noticed in the input range are disregarded and set to 0 during broadening.

At operation 506, the color spectrum controller 160b determines the first-new RGB value for each pixel of each segment (S1-S5) based on the typical wavelength range difference, the determined wavelength range difference, the obtained wavelength value, and the lowest value of wavelength, where the first-new RGB value is enhanced value of the RGB value. The first-new RGB value is calculated for each color for each segment (S1-S5) is given by the below equation, $W$new=(Range_new/Range_old)*($W$current−$Wol$)+$Wnu$   Equation 6

For example, the calculation for Wcurrent of 640 nm as per 502 for the S2 is as follows:

$W$new=(99/44)*(640−604)+601=682 nm.

The color spectrum controller 160b transforms the calculated range to the first-new RGB value is (255, 9, 0); this calculation is applied to each pixel of each segment (S1-S5).

At operation 507, the color spectrum controller 160b averages the range change ratio. An average range change ratio is calculated for each color of each segment (S1-S5) is given by equation 7:

Average change ratio=($\Sigma$Range change ratio for each color)/7   Equation 7

For example, the calculation for the segment S2 is as follows:

Average change ratio=(1.25+1.375+1.41)/7=0.576.

At operation 508, the color spectrum controller 160b determines the second-new RGB value for each pixel of each segment (S1-S5) based on the average change ratio, where the second-new RGB value is the enhanced value of the first-new RGB value. The second-new RGB value is calculated for each color for each segment (S1-S5) is given by equations 8 and 9:

$G$=min(255,$g$(1+$\delta$)) for values above 128   Equation 8

$G$=max(0,$g$(1−$\delta$)) for values below 128   Equation 9

In Equations 8 and 9, "$\delta$" indicates the average change ratio, "G" indicates a new gray level for the channel and "g" indicates an old gray level for the channel.

For example, the calculation for the S2 is as follows:

$R$=255*(1+0.576)=min(401,255)=255

$G$=9*(1−0.576)=4

$B$=0*(1−0.576)=0

The second-new RGB value is (255, 4, 0); this calculation is applied on each pixel of each segment (S1-S5).

At operation 509, the color spectrum controller 160b generates the enhanced foreground region of the ROI (S1) and the enhanced background region of the ROI (S2-S5), and sends it to the motion detector 160c for further processing.

FIGS. 6A, 6B, 6C, and 6D illustrate calculation and example scenarios where the motion detector 160c of the electronic device 100 identifies whether the foreground region of the ROI and/or the background region of the ROI including motion information and/or static information present in the image frame, according to an embodiment of the disclosure.

Figure 6A:
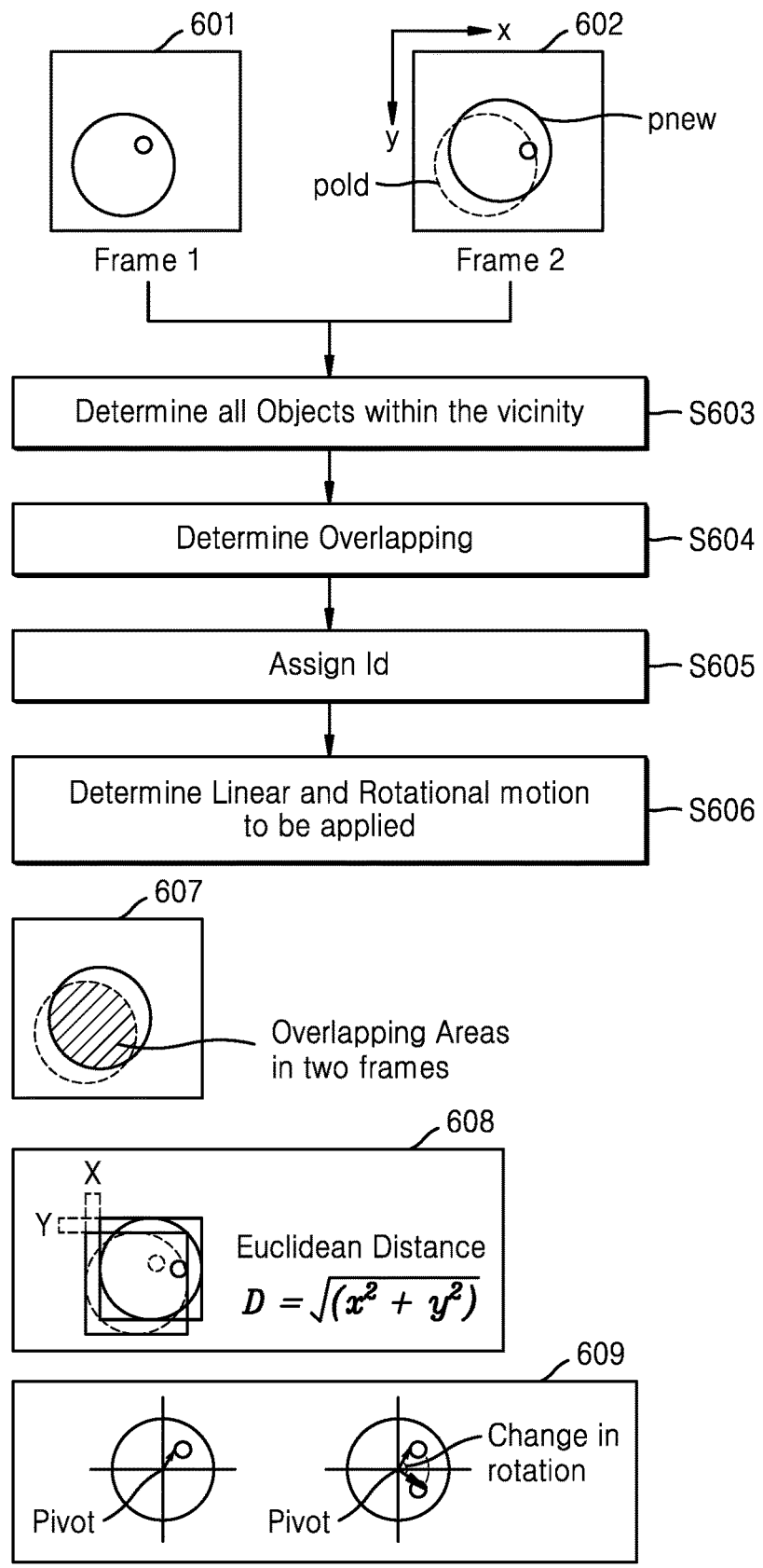

Referring to FIG. 6A, to identify that how motion is applied to the objects/segments of the image frame, the motion detector 160c calculates both the speed and direction of the motion in each segment (e.g., S1-S5). The motion detector 160c utilizes successive frames (601, 602) to identify the difference in the object position to calculate the difference in the position, and knowing frame rate can simply be utilized to compute the object's speed.

At operation 603, consider an example for two consecutive frames where Fi (601) and F (i+1) (602) be the $i^{th}$ and (i+1)th frame at time ti and t (i+1). Then, the motion detector 160c performs object segmentation on the ROIs (e.g. S1-S5) to determine fine objects. Then, the motion detector 160c determines all objects with the same type as in the previous frame (Fi 601) within a distance Dmax of the object in frame F (i+1) 602 and the maximum speed of the objects moving in a direction is given as Smax. The motion detector 160c determines the Dmax by Equations 9 and 10:

$$\Delta t = (t(i+1) - t(i))$$ Equation 10

$$D\max = S\max / \Delta t$$ Equation 11

At operations 604 and 605, the motion detector 160c uses maximum overlapping 607 to identify which objects are closest to each other. This is determined via a simple intersection of areas. The area that is common to both objects determines the maximum overlapping areas for two objects. For example, A1, A2 be the area in a number of pixels of the objects in Frame Fi 601 and F (i+1) 602. Let A3 be the area that is common to both. Then a percentage of the overlapping areas is given by Equation 12:

$$o = (A3/(A1+A2-A3))$$ Equation 12

The value of maximum o gives the object that is the same in both the frames. The objects with the maximum overlapping areas in the corresponding frames are considered same and are given same unique ID. The unique ID is a hash value that maps each object to a unique number in the frames. So the objects which are same will get the same hash in all the frames.

At operation 606, the motion detector 160c calculates a linear displacement 608 by considering the position of one of the corners of the bounding box and then comparing the difference in pixel values. The motion detector 160c calculates the rotational motion by a Quadtree decomposition 609, which is used to determine an amount of change in the pixel values around a pivot and then using that to determine an actual direction of motion and speed of change.

Figure 6B:
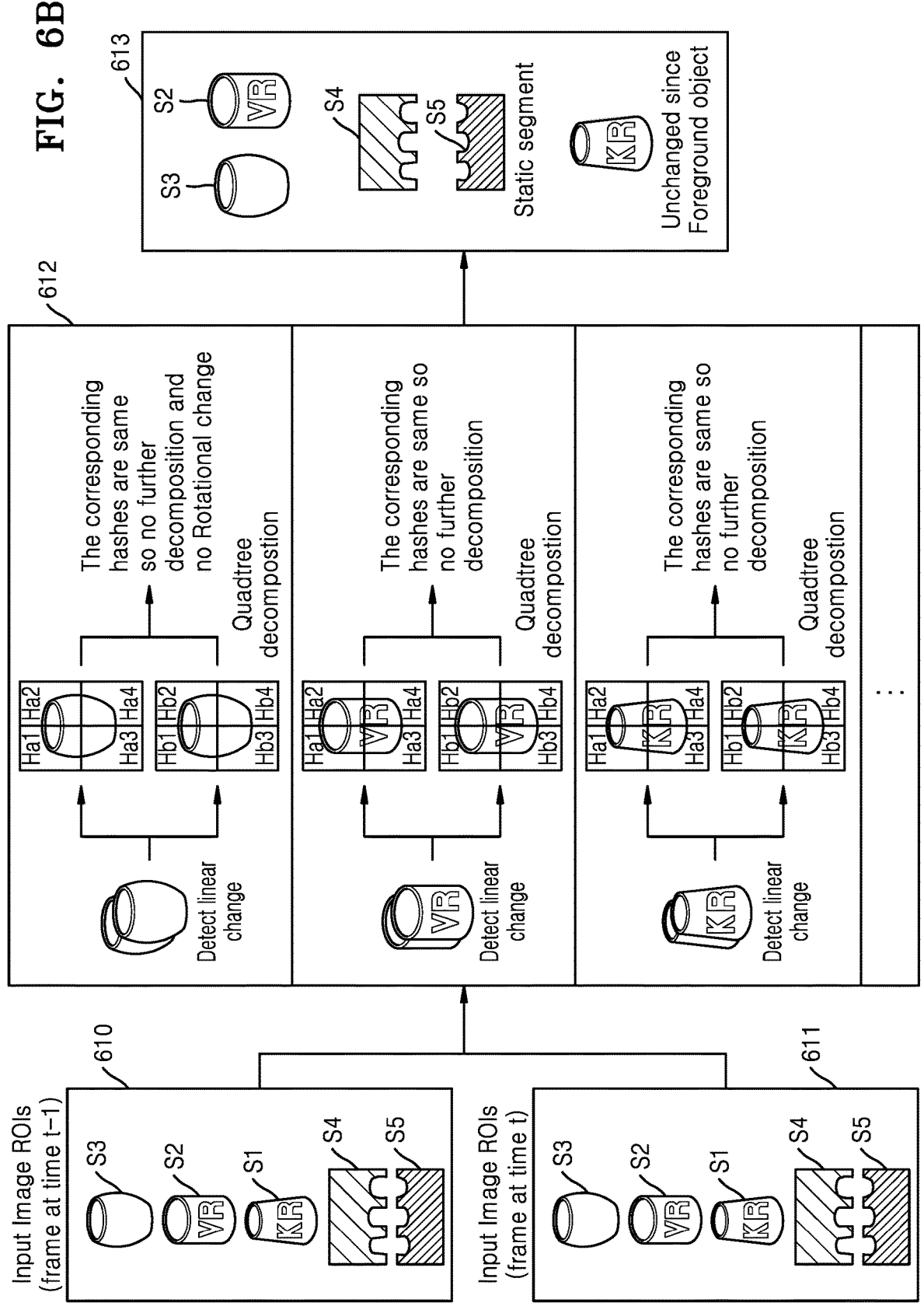

Referring to FIG. 6B, an example scenario where the motion detector 160c identifies whether the motion information and/or the static information present in the image frame, the motion detector 160c comparing two consecutive image frames (610, 611) for obtaining the motion information and/or the static information, as explained in FIG. 6A. The motion information including the linear motion and/or the rotational motion. The motion detector 160c uses a fine trained deep lab segmentation model to divide the segments (S1-S5) into finer detail segments.

At operations 612 and 613, the motion detector 160c calculates the linear motion based on the linear change in the position of each segment of the plurality of segments (S1-S5). Then, the motion detector 160c calculates the rotational motion by dividing each segment of the plurality of segments (S1-S5) of two consecutive image frames into four quads (e.g. For Frame-1 610: Ha1-Ha4, Frame-2 611: Hb1-Hb4). Then, the motion detector 160c calculates the hash value based on the RGB values for each quad and determines whether the hash value of at least two quads matches the corresponding frames. If corresponding hashes are the same so no further Quadtree decomposition is required and no rotational change. Based on the preceding stages, the motion detector 160c recognizes only the static information present in the current example situation.

Figure 6C:
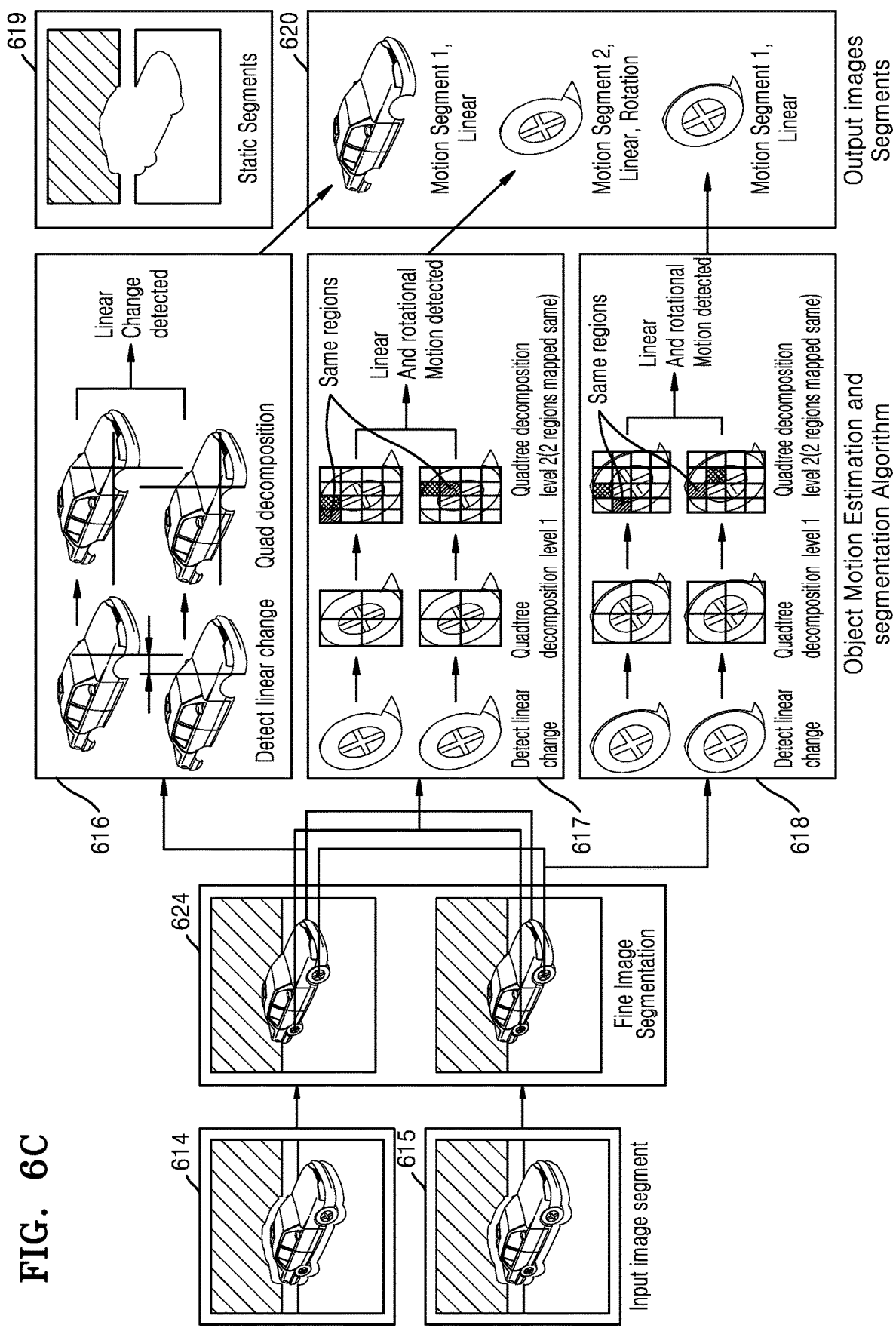

Referring to FIG. 6C, which illustrates another example scenario where the motion detector 160c identifies whether the motion information and/or the static information present in the image frame, the motion detector 160c compares two consecutive image frames (614, 615) for obtaining the motion information and/or the static information, as explained in FIG. 6A. The motion information including the linear motion and/or the rotational motion. The motion detector 160c uses a fine trained deep lab segmentation model to divide the segments (e.g. car body, front tire, back tire, or the like) into finer detail segments 624.

At operations 616, 617, and 618, the motion detector 160c calculates the linear motion based on the linear change in the position of each segment of the plurality of segments (e.g. car body, front tire, back tire, or the like). Then, the motion detector 160c calculates the rotational motion by dividing each segment of the plurality of segments of two consecutive image frames into four quads. Then, the motion detector 160c calculates the hash value based on the RGB values for each quad and determines whether the hash value of at least two quads matches the corresponding frames. If corresponding hashes are not the same so further Quadtree decomposition is required and rotational change present in the corresponding quad. Based on the preceding stages, the motion detector 160c recognizes the static information 619 and the motion information 620 present in the current example situation.

Referring to FIG. 6D, a detailed example scenario is illustrated where the motion detector 160c calculates the motion information. At operation 621, the motion detector 160c comparing two consecutive image frames (e.g. Frame (t−1) and Frame (t)) for obtaining the motion information. The motion detector 160c calculates the linear motion based on the linear change separation is given by (330−320, 320, 316)=(10, −4); this calculation estimate linear blur. At operation 622, the motion detector 160c calculates the rotational motion by dividing each segment of the plurality of segments of two consecutive image frames into four quads. Then, the motion detector 160c calculates the hash value based on the RGB values for each quad and determines whether the hash value of at least two quads matches the corresponding frames. Here, in this example scenario, further decomposition is required as no areas are mapped.

At operation 623, the motion detector 160c again divides each segment of the plurality of segments of two consecutive image frames into four quads. In this example scenario, no further decomposition is required as multiple (2 or more) areas have already been mapped. Further, the motion detector 160c calculates "0", which represents the change in rotation from Frame (t−1) to Frame (t). A radial motion blur will be applied based on the value of the θ, in the direction of the motion (clockwise in this case). Based on the preceding stages, the motion detector 160c recognizes the motion information (e.g. θ=0.52539 rad, clockwise and Linear separation=(10, −4)) present in the current example situation.

FIGS. 7A, 7B, 7C, and 7D illustrate calculation and an example scenario where the blur generator of the electronic device automatically applies the motion type blur and/or static type blur effect on the foreground region of the ROI and/or the background region of the ROI, according to an embodiment of the disclosure.

Figure 7A:
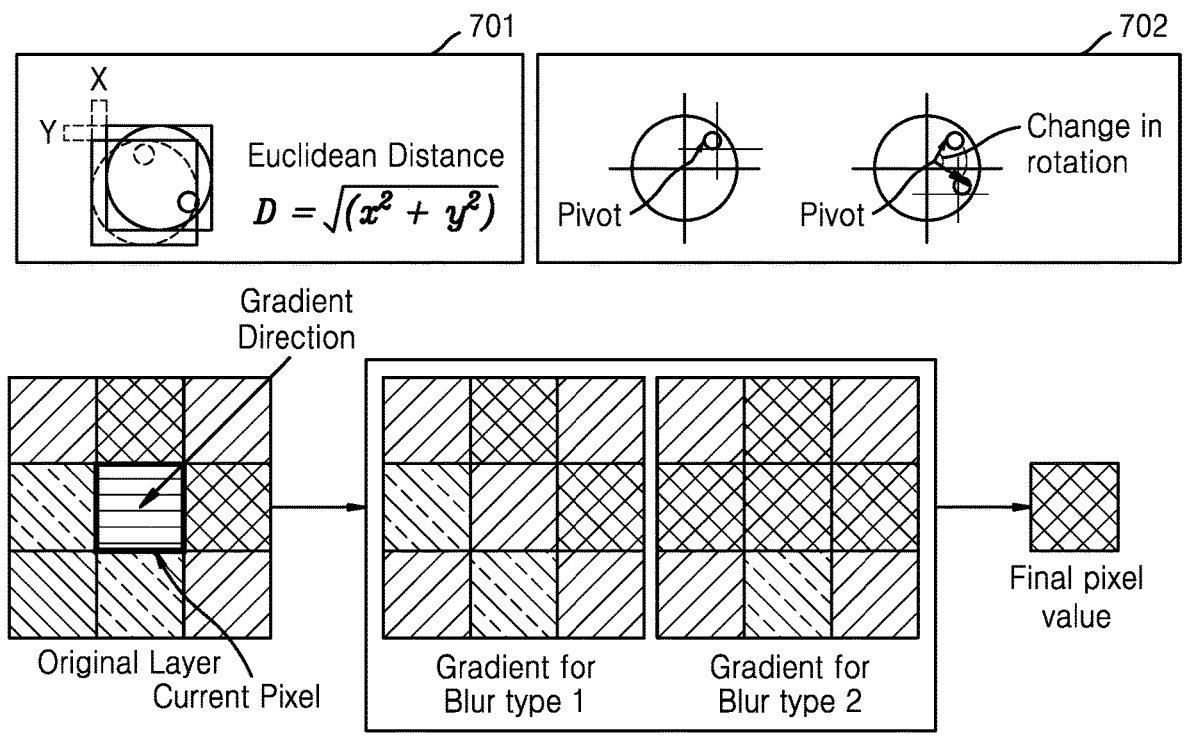
FIGS. 7A, 7B, 7C, and 7D illustrate calculation and an example scenario where the electronic device automatically applies a motion type blur and/or static type blur effect on the foreground region of the ROI and/or the background region of the ROI, according to an embodiment of the disclosure.

Referring to FIG. 7A, the blur generator 160*d* applies the linear motion blur based on the linear displacement and rotation calculation as explained in FIGS. 6A-6D. The linear displacement can be easily calculated by considering the position of one of the corners of the bounding box and then comparing the difference in pixel values and speed of motion 701 is given by, $$\text{Speed of motion}=D/\Delta t \qquad \text{Equation 13}$$

The amount of linear motion blur applied is proportional to the speed of motion and is applied in direction of blur to the surroundings of the focused object. Further, the blur generator 160*d* applies the radial motion blur based on the Quadtree decomposition, as explained in the FIGS. 6A, 6B, 6C, and 6D, with increased depth is used to determine the exact change in angle 702, the direction can be a clockwise and/or an anti-clockwise, amount of speed is given by, $$\text{Speed}=\Theta/\Delta t \qquad \text{Equation 14}$$

Where, $\Theta$=(change in angle), the amount of radial blur applied is proportional to the amount of speed.

At operation 703, example scenario for gradient-based blur identification by the blur generator 160*d*:

Each blur is applied to separate layer depth maps as shown in FIG. 703.

This will be used in the next operation when the gradient ratio for blur type estimation.

For each background layer in the depth map:

Variance ($\sigma$) for filters is determined as linearly increasing function.

The size of a kernel is determined as 2*ceil (2$\sigma$)+1 (for disk averaging, the radius is taken as ceil (2$\sigma$)). The reason for taking size as such is based on the Gaussian kernel. The Gaussian kernel values become negligible after this size towards the border.

The image pixels corresponding to the background layer are blurred.

Furthermore, the blur generator 160*d* estimates per pixel Gradient ratio, Gradient is the change in value when moving from one pixel to another. Consider, Dorig is gradient for the original image and pixel p and Dbi is gradient for blur type i for pixel p. The blur generator 160*d* calculates Dorig/Dbi, which gives a ratio of the gradient of the original image to the blurred image. Furthermore, the blur generator 160*d* determines the blur type based on a max (Dorig/Dbi). The max (Dorig/Dbi) gives a minimum change in color when moving from a nearby pixel towards the target pixel/current pixel. Furthermore, the blur generator 160*d* determines gradient value for Pixel P is calculated using a root mean square formula as defined in Equation 15:

$$D(x, y) = \frac{1}{2}\left(\sum_{\substack{cx=\{-s,s\}\\cy=\{-s,s\}}} (p(x, y) - p(x + cx, y + cy))\right)^{1/2} \qquad 55$$

In Equation 15, D(x, y) is the Gradient at pixel (x, y) and s is the operation size of the gradient. Usually, the value of s will be 3-10. But different values can be used based on the depth layer and using more advanced object-defining algorithms. E.g. for larger objects, a larger s can be used for better blurring, while smaller values will work when using for smaller objects.

Furthermore, the blur generator 160*d* optimizes a similar blur region by calculating the distance between two-pixel values as follows:

$$\text{Difference}=|\text{Target}(R,G,B)-\text{Nearby}(R,G,B)|=[|\text{Target}(R)-\text{Nearby}(R)|, |\text{Target}(G)-\text{Nearby}(G)|, |\text{Target}(B)-\text{Nearby}(B)|]=\text{Difference}(R),\text{Difference}(G),\text{Difference}(B) \qquad \text{Equation 16}$$

$$\text{Distance}=\text{Max}(\text{Difference}(R),\text{Difference}(G),\text{Difference}(B)) \qquad \text{Equation 17}$$

The blur generator 160*d* determines if (Distance <17), the pixel is considered to be in the same segment and otherwise, the pixel is ignored; calculation of threshold "17" 703*a* is calculated by: Total number of colors is 16777216 (2^24), number of distinguishable colors by a human eye is 10,000, 000, Number of indistinguishable colors is 6777216. Since there are 3 channels Red, Green, Blue, therefore each channel contributes around 2259072 (6777216/3) colors which are approximately 13.46% (2259072/16777216). Since a single channel value varies from 0-255 therefore 0.1346*255=34.323~35 hence 35 consecutive values are approximately indistinguishable. Hence, around a target of 17 values on each side can be considered similar.

Figure 7B:
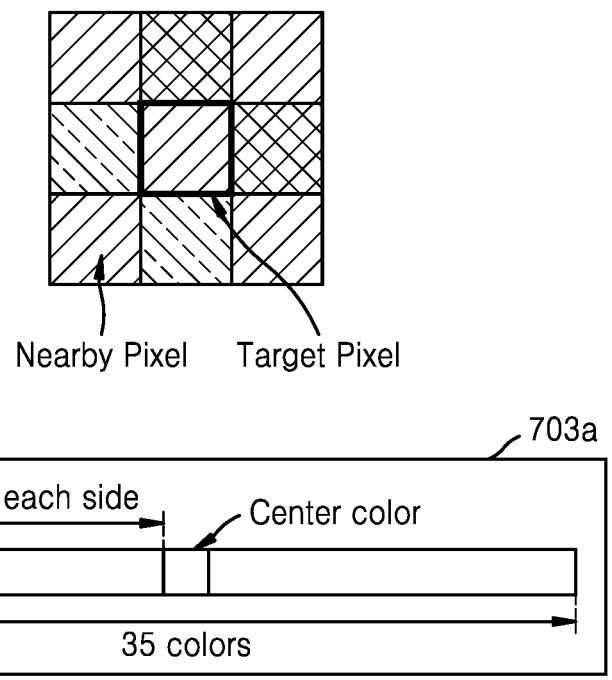
Figure 7C:
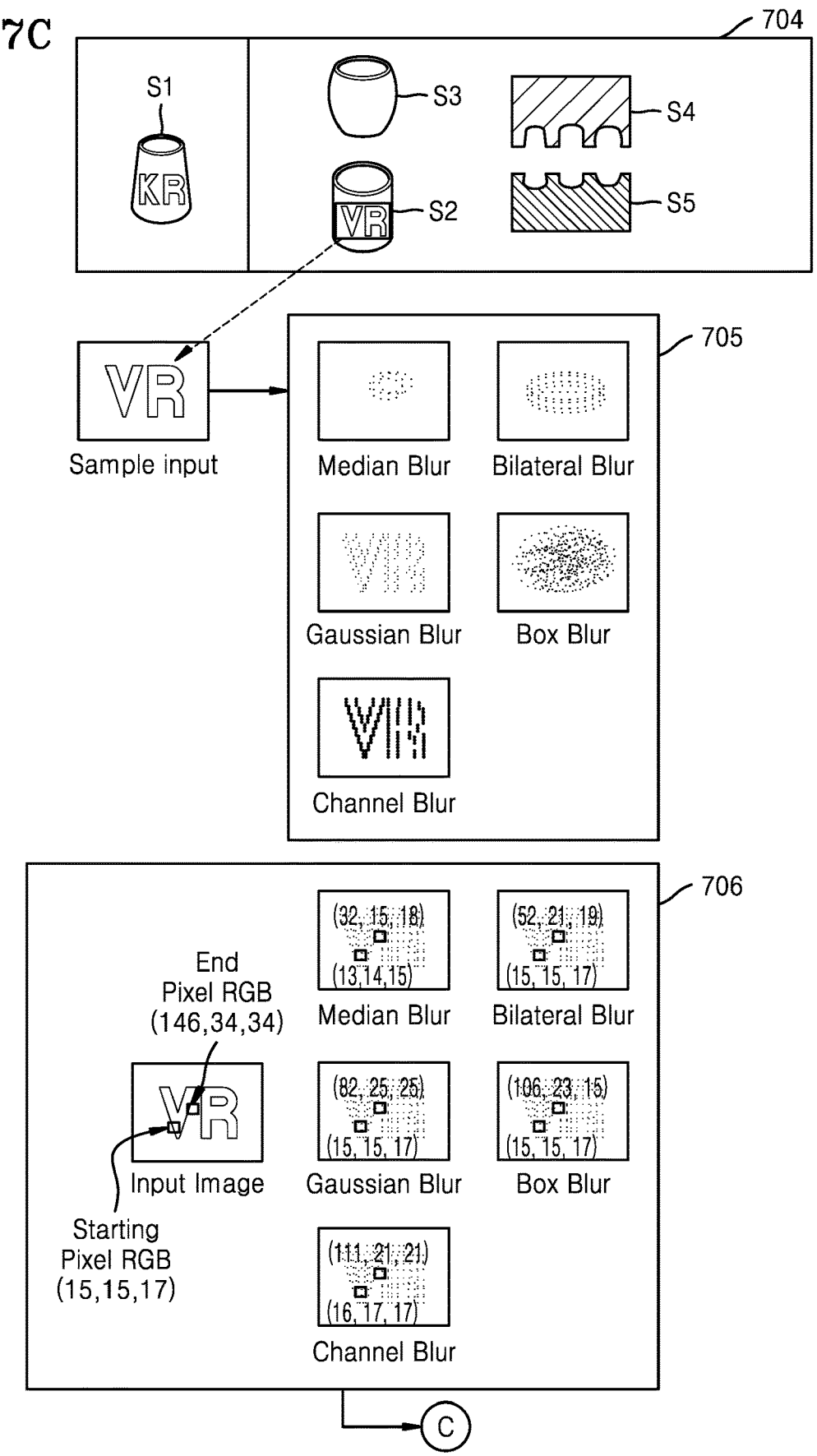
Figure 7D:
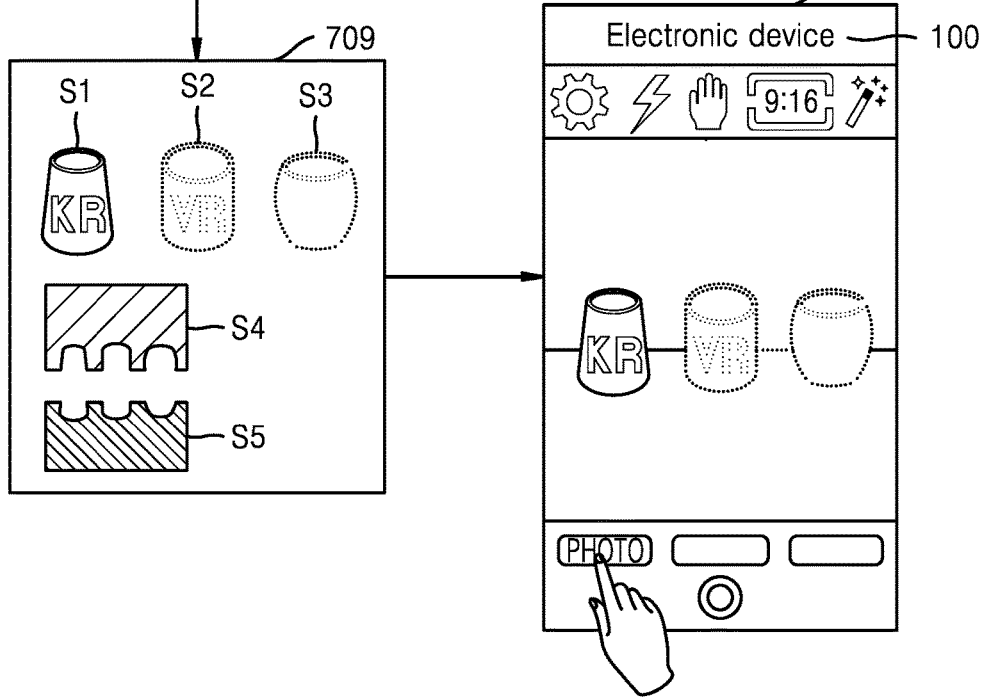

Referring to FIGS. 7B and 7C, consider the example of the yellow bounded region all the static blurs are applied to this region. At operations 704 and 705, the blur generator 160*d* applies the plurality of blur effect (e.g. Median blur, a Bilateral blur, a Gaussian blur, a Box blur, a Channel blur) on the foreground region of the ROI (S1) and/or the background region of the ROI (S2-S5) when the foreground region of the ROI (S1) and/or the background region of the ROI (S2-S5) contains the static information.

At operations 706 and 707, the blur generator 160*d* calculates the absolute difference (|Vs−Ve|) in the RGB value when moving from one pixel to another pixel in each sub-segment (S1-S5) for each blur effect of the plurality of blur effect. Then, the blur generator 160*d* applies the optimal blur effect (e.g. Median blur) from the plurality of blur effect based on the minimum change (e.g. D=Root Mean Square (RMS)=19.6) in color or the maximum change ratio (Dorg/Di) associated with the calculated absolute difference. For example, consider the row 2 highlighted by rectangle for median blur: Absolute difference=|(13, 14, 15)−(32, 15, 18)|=(|13−32|, |14−15|, |15−18|)=(19, 1, 3) and RMS is calculated by Dorg/Di=(133/19.26)=6.9. Dorg is RMS value for the original image and Di is the RMS value for the blur. For example, Pixel values for all the blurs can be summarized and blur selection for the yellow bounded region, as shown in Table 6, this calculation is done for each pixel of each segment by the blur generator (160*d*) which contains the static information. Table 7 and Table 8 shows why the media blur is selected based on the calculation above.

TABLE 7

| Blur Type | RGB for nearby pixel (Vs) | RGB for target Pixel (Ve) |
|---|---|---|
| Original Image | 15, 15, 17 | 146, 34, 34 |
| Median Blur | 13, 14, 15 | 32, 15, 18 |
| Bilateral Blur | 15, 15, 17 | 59, 21, 19 |
| Gaussian Blur | 15, 15, 17 | 82, 25, 25 |
| Box Blur | 15, 15, 17 | 106, 23, 15 |
| Channel Blur | 16, 17, 17 | 111, 26, 21 |

TABLE 8

| Absolute Difference (Ve − Vs) | RMS (D) | Dorg/Di |
|---|---|---|
| 131, 19, 17 | 133 | 1 |
| 19, 1, 3 | 19.26 | 6.9 |

TABLE 8-continued

| Absolute Difference (Ve − Vs) | RMS (D) | Dorg/Di |
|---|---|---|
| 44, 6, 2 | 44.45 | 2.99 |
| 67, 10, 8 | 68.21 | 1.94 |
| 91, 8, 2 | 91.37 | 1.455 |
| 95, 9, 4 | 95.51 | 1.39 |

Based on Dorg/Di in Table 8, the Median blur is selected as optimal blur.

At operation 708, since nearby pixels have almost similar RGB values optimization is done by selecting all the nearby pixels which have the RGB pixel values within the range of the original target pixel. The area is constructed by considering all the pixels within the range of the target pixel which have a threshold of less than 17 pixels for a single channel. An example of the calculations by the blur generator 160d: Target pixel is (146, 34, 34) and nearby pixel is (146, 42, 29), Absolute difference=(|146−146|, |34−42|, |34−29|) is (0, 8, 5) and Channel distance is Max (0, 8, 5)=8. Since the result value 8 is less than 17 (8<17), the pixel is considered to be in the same segment. At operation 709, the above mention calculation is done for each pixel of each segment by the blur generator (160d) which contains the static information, and based on the calculation the blur generator (160d) selects/applies the optimal blur effect on a particular region of the segment. At operation 710, the blur generator 160d generates the multi-type blurring effect in real-time in the media file (e.g. image frame), enhancing the user's experience.

Figure 8A:
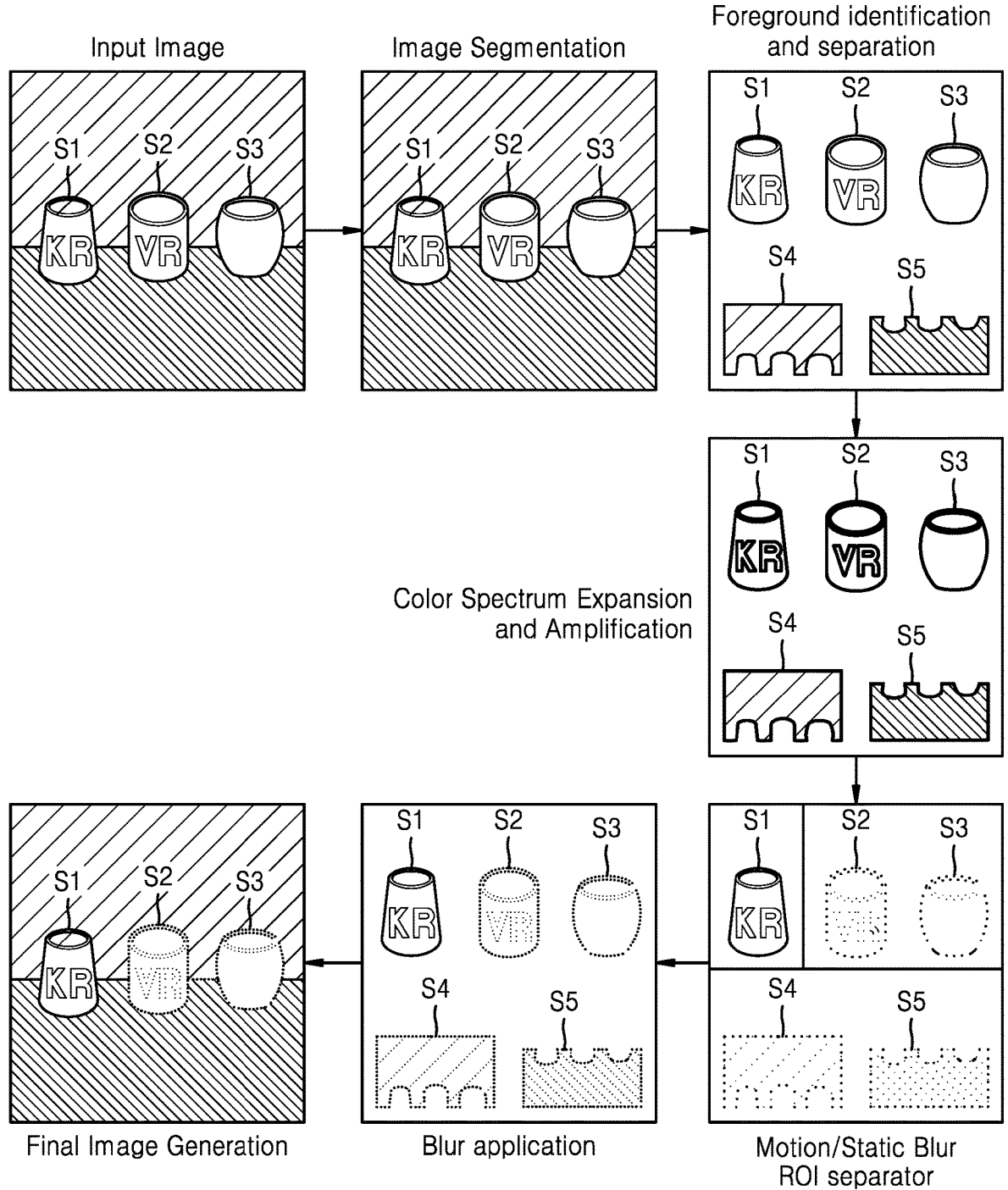
FIGS. 8A and 8B illustrate an example flow diagram for producing the media file with the Bokeh effect, according to an embodiment of the disclosure.
Figure 8B:
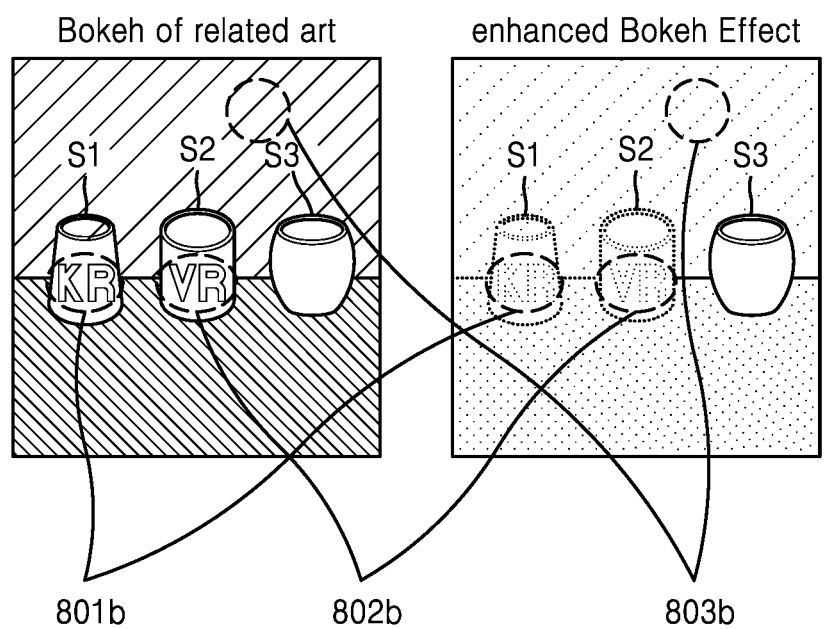

FIGS. 8A and 8B illustrate an example flow diagram for producing the media file with the Bokeh effect and a comparison between the Bokeh effect of the existing method/electronic device and the Bokeh effect of the proposed method/electronic device, according to an embodiment of the disclosure.

Referring to FIG. 8A, the example flow diagram for producing the media file with the Bokeh effect. The technical description of operations 801a to 807a is already explained in FIGS. 2 to 4, 5A to 5C, 6A to 6D, 7A, and 7B.

Referring to FIG. 8B, at operation 801b, details in the ROI's foreground region are significantly clearer and more noticeably separated from the ROI's background region in the proposed bokeh effect. At operation 802b, the proposed bokeh effect reduces unwanted contrasting features while keeping general background object details. At operation 803b, segmentation along with ROI separation helps to minimize the unwanted details in the Non-ROI background regions.

The proposed bokeh effect in operation 804a provides color amplification in the foreground region and range extension may be seen. Further improvement may be seen in contrasting sections of the background region when applying numerous blurs. As a result of this blurring effect, the foreground is distinct and the background is smoothed. Grains were visible in the image background wall earlier which were smoothened in a final image, as can be seen in reference numerals 801b, 802b, and 803b.

The proposed method enhances the bokeh effect where the images are segmented in operation 805a (i.e., foreground region and background region are separated and objects are extracted from the background one by one to find ROI). After that, each region is analyzed, and based on the gradient difference different types of blur are applied to different objects in operation 806a. The foreground region is also analyzed to check if the object is in motion and accordingly the different types of motion blur i.e. radial or motion type blur are applied to the foreground region and surrounding region so that the object appears in motion. Finally, in operation 807a, all the objects are merges and a Gaussian smoothening is applied on the background region so that the area near the boundaries of different segments appears as one unit and not different segments.

Figure 9A:
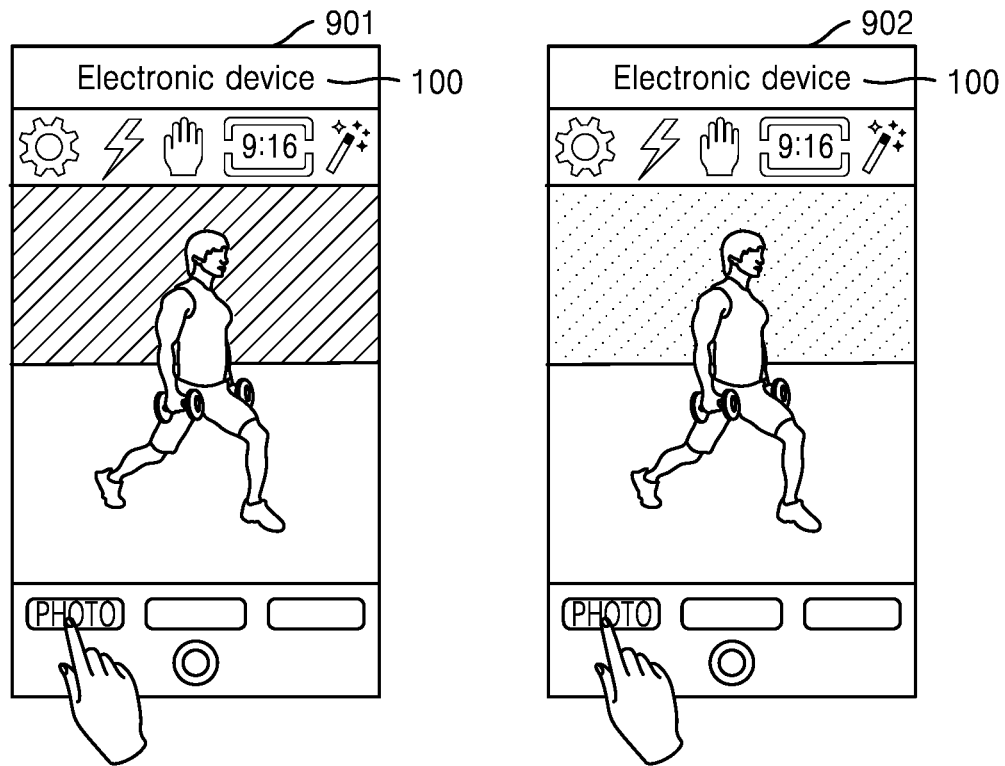
FIGS. 9A and 9B illustrate example scenarios for real-time Bokeh effect generation for videos and a ring effect correction due to multiple light reflections on a camera of the electronic device according to various embodiments of the disclosure.
Figure 9B:
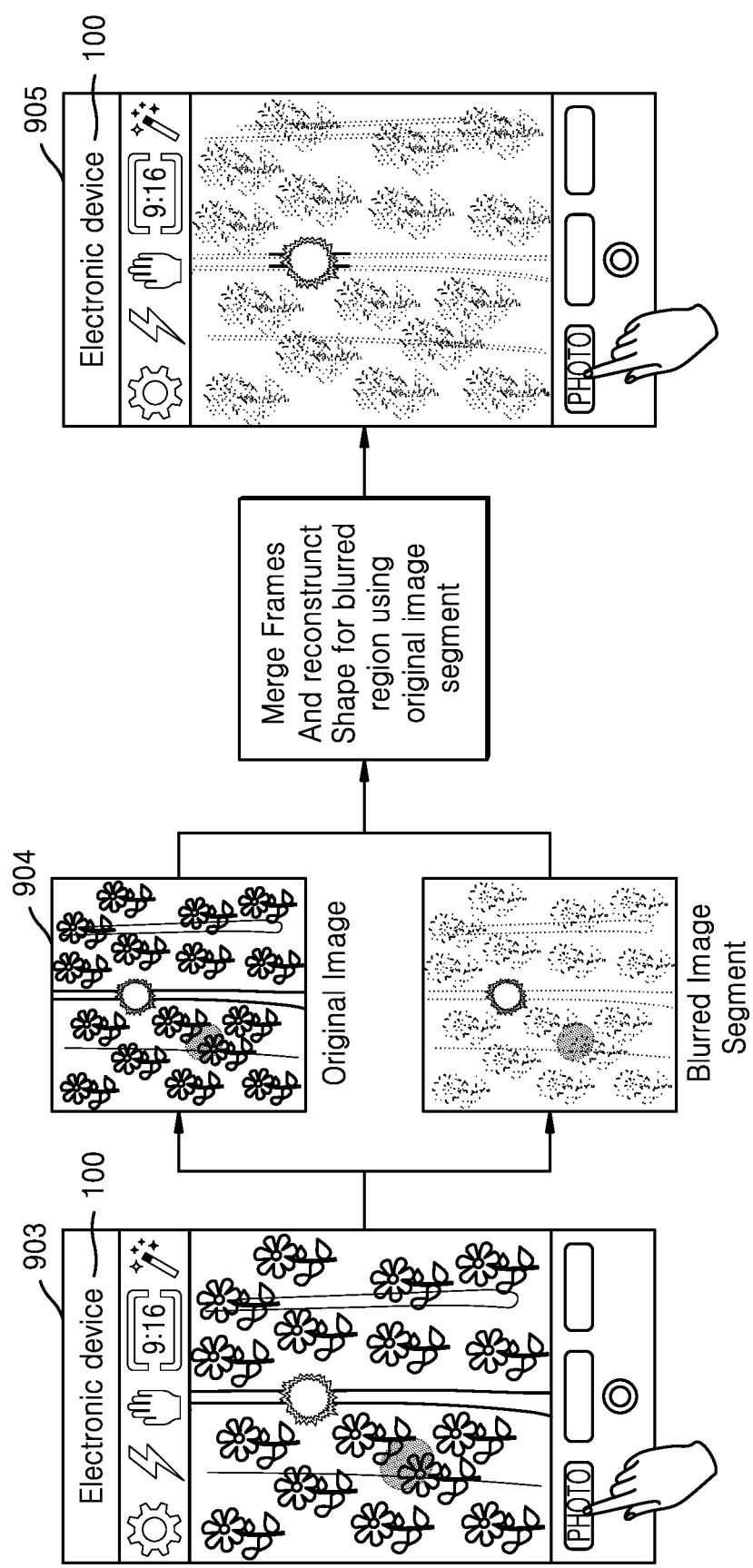

FIGS. 9A and 9B illustrate example scenarios for real-time Bokeh effect generation for videos and a ring effect correction due to multiple light reflections on a camera of the electronic device according to an embodiment of the disclosure.

Referring to FIG. 9A, in the method/electronic device for live focus videos according to the related art, the bokeh effect does not change automatically based on the background region. There are few filters available, but the user needs to change the filters manually based on the background region, and if the background region changes (for example, an object begins to move), then the filters do not work effectively and the user needs to change the filter. Also, the blur intensity is not suggested and the user needs to update the blur intensity based on background. While the proposed method (901-902) automatically applies the motion type blur effect on the foreground region of the ROI and/or the background region of the ROI that contains motion information and the static type blur effect on the foreground region of the ROI and/or the background region of the ROI that contains static information. As a result, the multi-type blurring effect is created in real-time in the media file, enhancing the user's experience.

Referring to FIG. 9B, sometimes when the image contains a bright source light, as in image 903, it may be possible that sometimes ring effect will be observed due to internal reflection in the camera with rings around an object. The proposed method can be used to correct this effect. The original image 903 is passed through the AI engine 160e trained to detect this effect. During the ROI separation region. The resulting image 904 is passed further down the pipeline until the blur is applied dynamically using the proposed method. The proposed method reduces the effect of the ring in the input image 905. The input image is then merged with the original image while the corrected colors from the blur applied will be used to correct the effect.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method, performed by an electronic device, for generating a media file with blur effects, the method comprising:
obtaining, by the electronic device, an image frame;
segmenting, by the electronic device, the image frame into a plurality of segments;
determining, by the electronic device, at least one first segment from the plurality of segments including a foreground region of the image frame;

determining, by the electronic device, at least one second segment from the plurality of segments including a background region of the image frame;
detecting, by the electronic device, whether at least one of the foreground region or the background region includes motion information;
detecting, by the electronic device, whether at least one of the foreground region or the background region includes static information;
applying, by the electronic device, a motion type blur effect on the at least one of the foreground region or the background region of the ROI including the motion information;
applying, by the electronic device, a plurality of blur effects on the foreground region when the foreground region includes the static information;
applying, by the electronic device, a static type blur effect on the background region when the background region includes the static information;
generating, by the electronic device, the media file based on the applied the motion type blur effect and the static type blur effect; and
storing, by the electronic device, the media file.

2. The method of claim 1, wherein the determining of the at least one first segment, and the determining of the at least one second segment, comprises obtaining the at least one of the foreground region or the background region using at least one of a manual selection of a user of the electronic device or an artificial intelligence (AI) model applied to the image frame.

3. The method of claim 1, further comprising:
enhancing a color spectrum region for each segment of the plurality of segments,
wherein the enhancing of the color spectrum region comprises:
generating, by the electronic device, the color spectrum region for each segment; and
expanding, by the electronic device, a wavelength range of the generated color spectrum region to enhance a value of each pixel of each segment.

4. The method of claim 3, wherein the generating of the color spectrum region for each segment comprises:
obtaining, by the electronic device, a wavelength value for each pixel of each segment, wherein each pixel includes a red, green, blue (RGB) value;
categorizing, by the electronic device, the obtained wavelength value based on the color spectrum region, wherein the color spectrum region ranges from a red color to a violet color; and
determining, by the electronic device, the wavelength range and a wavelength range difference for each color of each segment, wherein the wavelength range includes a lowest value of wavelength and a highest value of wavelength.

5. The method of claim 3, wherein the expanding of the wavelength range of the generated color spectrum region to enhance the value of each pixel of each segment comprises:
determining, by the electronic device, a typical wavelength range and a typical wavelength range difference for each color of each segment;
determining, by the electronic device, an absolute difference between the determined wavelength range difference and the typical wavelength range difference for each color of each segment;
determining, by the electronic device, a range change ratio for each color of each segment by dividing the absolute difference by the determined wavelength range;
determining, by the electronic device, a first-new red, green, blue (RGB) value for each pixel of each segment based on the typical wavelength range difference, the determined wavelength range difference, the obtained wavelength value, and the lowest value of wavelength, wherein the first-new RGB value is enhanced value of the RGB value;
averaging, by the electronic device, the range change ratio; and
determining, by the electronic device, a second-new RGB value for each pixel of each segment based on the average change ratio, wherein the second-new RGB value is the enhanced value of the first-new RGB value.

6. The method of claim 1,
wherein the detecting of whether the at least one the foreground region and the background region includes the motion information comprises comparing, by the electronic device, two consecutive image frames for obtaining the motion information,
wherein the detecting of whether the at least one the foreground region and the background region includes the static information comprises comparing, by the electronic device, the two consecutive image frames for obtaining the static information, and
wherein the motion information includes at least one of a linear motion or a rotational motion.

7. The method of claim 6, wherein the linear motion is calculated based on a linear change in a position of each segment of the plurality of segments.

8. The method of claim 6, wherein the rotational motion is calculated by:
dividing, by the electronic device, each segment of the plurality of segments of the two consecutive image frames into four quads;
calculating, by the electronic device, a hash value based on red, green, blue (RGB) values for each quad;
determining, by the electronic device, whether the hash value of at least two quads match in the two consecutive image frames; and
performing, by the electronic device, one of:
detecting the rotational motion in response to determining that the at least two quads match in the two consecutive image frames, or
dividing each segment of the two consecutive image frames into four quads in response to determining that the at least two quads do not match in the two consecutive image frames.

9. The method of claim 1, wherein at least one of:
the applying of the motion type blur effect on the at least one of the foreground region or the background region including the motion information comprises:
applying the motion type blur effect on the foreground region when the foreground region includes the motion information; and
applying the motion type blur effect on the background region when the background region includes the motion information, or
the applying of the static type blur effect on the background region when the background region includes the static information comprises:
applying the plurality of blur effects on the background region when the background region includes the static information.

10. The method of claim 9, wherein, the applying of the plurality of blur effects on the foreground region when the foreground region includes the static information, and the applying of the plurality of blur effects on the background region when the background region includes the static information, comprises:
calculating, by the electronic device, an absolute difference in a red, green, blue (RGB) value when moving from one pixel to another pixel in each sub-segment for each blur effect of the plurality of blur effects; and
applying, by the electronic device, an optimal blur effect from the plurality of blur effects based on a minimum change in color or a maximum change ratio associated with the calculated absolute difference.

11. An electronic device for generating a media file with blur effects, the electronic device comprising:
memory including one or more storage media, storing instructions; and
one or more processors communicatively coupled to the memory,
wherein the instructions, when executed by the one or more processors individually or collectively, cause the electronic device to:
obtain an image frame,
segment the image frame into a plurality of segments,
determine at least one first segment from the plurality of segments including a foreground region of the image frame,
determine at least one second segment from the plurality of segments including a background region of the image frame,
detect whether at least one of the foreground region or the background region includes motion information,
detect whether at least one of the foreground region or the background region includes static information,
apply a motion type blur effect on the at least one of the foreground region or the background region including the motion information, and
apply a plurality of blur effects on the the foreground region when the foreground region includes the static information,
apply a static type blur effect on the background region when the background region includes the static information,
generate the media file based on the applied motion type blur effect and the static type blur effect, and
store the media file in the memory.

12. The electronic device of claim 11, wherein the instructions, when executed by the one or more processors individually or collectively, further cause the electronic device to;
obtain the at least one of the foreground region or the background region using at least one of a manual selection of a user of the electronic device or an artificial intelligence (AI) model applied to the image frame.

13. The electronic device of claim 11, wherein the instructions, when executed by the one or more processors individually or collectively, further cause the electronic device to:
enhance a color spectrum region for each segment of the plurality of segments by:
generating the color spectrum region for each segment; and
expanding a wavelength range of the generated color spectrum region to enhance a value of each pixel of each segment.

14. The electronic device of claim 13, wherein the instructions, when executed by the one or more processors individually or collectively, further cause the electronic device to;
generate the color spectrum region for each segment by:
obtaining a wavelength value for each pixel of each segment, wherein each pixel includes a red, green, blue (RGB) value;
categorizing the obtained wavelength value based on the color spectrum region, wherein the color spectrum region ranges from a red color to a violet color; and
determining the wavelength range and a wavelength range difference for each color of each segment, wherein the wavelength range includes a lowest value of wavelength and a highest value of wavelength.

15. The electronic device of claim 13, wherein the instructions, when executed by the one or more processors individually or collectively, further cause the electronic device to:
expand the wavelength range of the generated color spectrum region to enhance the value of each pixel of each segment by:
determining a typical wavelength range and a typical wavelength range difference for each color of each segment;
determining an absolute difference between the determined wavelength range difference and the typical wavelength range difference for each color of each segment;
determining a range change ratio for each color for each segment by dividing the absolute difference by the determined wavelength range;
determining a first-new red, green, blue (RGB) value for each pixel of each segment based on the typical wavelength range difference, the determined wavelength range difference, the obtained wavelength value, and the lowest value of wavelength, wherein the first-new RGB value is enhanced value of the RGB value;
averaging the range change ratio; and
determining a second-new RGB value for each pixel of each segment based on the average change ratio, wherein the second-new RGB value is the enhanced value of the first-new RGB value.

16. The electronic device of claim 11,
wherein the instructions, when executed by the one or more processors individually or collectively, further cause the electronic device to;
detect whether the at least one the foreground region or the background region includes the motion information by comparing two consecutive image frames for obtaining the motion information; and
detect whether the at least one the foreground region or the background region includes the static information by comparing the two consecutive image frames for obtaining the static information, and
wherein the motion information includes at least one of a linear motion or a rotational motion.

17. The electronic device of claim 16, wherein the linear motion is calculated based on a linear change in a position of each segment of the plurality of segments.

18. The electronic device of claim 16, wherein the instructions, when executed by the one or more processors individually or collectively, further cause the electronic device to calculate the rotational motion by:

dividing each segment of the plurality of segments of the two consecutive image frames into four quads;

calculating a hash value based on red, green, blue (RGB) values for each quad;

determining whether the hash value of at least two quads match in the two consecutive image frames; and performing one of:

detecting the rotational motion in response to determining that the at least two quads match in the two consecutive image frames, or dividing each segment of the two consecutive image frames into four quads in response to determining that the at least two quads do not match in the two consecutive image frames.

19. The electronic device of claim 11, wherein the instructions, when executed by the one or more processors individually or collectively, further cause the electronic device to at least one of:

apply the motion type blur effect on the at least one of the foreground region or the background region including the motion information by:

applying the motion type blur effect on the foreground region when the foreground region includes the motion information; and applying the motion type blur effect on the background region when the background region includes the motion information, or apply the static type blur effect on the background region when the background region includes the static information by:

applying the plurality of blur effects on the background region when the background region includes the static information.

20. The electronic device of claim 19, wherein the instructions, when executed by the one or more processors individually or collectively, further cause the electronic device to:

apply the plurality of blur effects on the foreground region when the foreground region includes the static information, and apply the plurality of blur effects on the background region when the background region includes the static information, by:

calculating an absolute difference in a red, green, blue (RGB) value when moving from one pixel to another pixel in each sub-segment for each blur effect of the plurality of blur effects; and applying an optimal blur effect from the plurality of blur effects based on a minimum change in color or a maximum change ratio associated with the calculated absolute difference.

\* \* \* \* \*